United States Patent
Washio et al.

(10) Patent No.: US 7,672,846 B2
(45) Date of Patent: Mar. 2, 2010

(54) SPEECH RECOGNITION SYSTEM FINDING SELF-REPAIR UTTERANCE IN MISRECOGNIZED SPEECH WITHOUT USING RECOGNIZED WORDS

(75) Inventors: Nobuyuki Washio, Kawasaki (JP); Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 708 days.

(21) Appl. No.: 11/324,463

(22) Filed: Jan. 4, 2006

(65) Prior Publication Data
US 2007/0050190 A1   Mar. 1, 2007

(30) Foreign Application Priority Data
Aug. 24, 2005   (JP)   ............... 2005-243297

(51) Int. Cl.
G10L 15/04 (2006.01)
G10L 15/00 (2006.01)

(52) U.S. Cl. ................... 704/251; 704/253

(58) Field of Classification Search ........... 704/249, 704/248, 240, 215, 239, 251, 253; 711/117
See application file for complete search history.

(56) References Cited

U.S. PATENT DOCUMENTS 6,324,509 B1 * 11/2001 Bi et al. ............... 704/248
6,836,822 B1 * 12/2004 Hatano et al. ........... 711/117
7,277,853 B1 * 10/2007 Bou-Ghazale et al. ...... 704/248
7,412,382 B2 * 8/2008 Noda et al. .............. 704/233
2005/0216264 A1 * 9/2005 Attwater et al. .......... 704/239

FOREIGN PATENT DOCUMENTS

| JP | 7-230293 | 8/1995 |
| JP | 11-24693 | 1/1999 |
| WO | WO 2004/002125 A2 | 12/2003 |

OTHER PUBLICATIONS

Office Action dated Sep. 11, 2009 corresponding to Chinese patent application No. 200610006952.X with English translation.

\* cited by examiner

*Primary Examiner*—Talivaldis Ivars Smits
*Assistant Examiner*—Farzad Kazeminezhad
(74) *Attorney, Agent, or Firm*—Kratz, Quintos & Hanson, LLP

(57) ABSTRACT

A voice recognition system and a voice processing system in which a self-repair utterance can be inputted and recognized accurately, as in a conversation in which a human user makes a self-repair utterance. A signal processing unit converts speech voice data into a feature, a voice section detecting unit detects voice sections in the speech voice data, and a priority determining unit selects a voice section that includes a self-repair utterance from among the voice sections according to a priority criterion without using any result of recognizing a speech vocabulary sequence. Priority criteria can include a length of the voice section, signal to noise ratio, chronological order of the voice section as well as speech speed. A decoder calculates a matching score with a recognition vocabulary using the feature of the voice section and an acoustic model.

18 Claims, 10 Drawing Sheets

SPEECH RECOGNITION SYSTEM FINDING SELF-REPAIR UTTERANCE IN MISRECOGNIZED SPEECH WITHOUT USING RECOGNIZED WORDS

BACKGROUND OF THE INVENTION

1. Field of the Invention

The present invention relates to a voice recognition system and a voice processing system for recognizing a speech vocabulary sequence from a user's voice and accepting it as an input to the system. In particular, the present invention relates to a voice recognition system and a voice processing system in which a self-repair utterance (also referred to as a speech-repair utterance) immediately after a misstatement can be inputted and recognized appropriately. It should be noted that the voice recognition system is also referred to as an auto speech recognition system or a speech recognition system in some cases.

2. Description of Related Art

Conventionally, as a means of accepting an input from a user, a voice recognition system that utilizes a voice recognition engine so as to recognize a speech vocabulary sequence from a user's voice and accept it as an input to the system has been known. Such a voice recognition system has already been commercialized in, for example, information delivery systems including a voice portal and a car navigation system.

FIG. 10 illustrates an exemplary configuration of a conventional voice recognition system. A voice recognition system 90 shown in FIG. 10 includes a signal processing unit 91, a voice section detecting unit 92, a decoder 93, a grammar storing unit 94, an acoustic model storing unit 95, a vocabulary dictionary storing unit 96 and a result output unit 97.

When a voice uttered by a user is inputted, the voice section detecting unit 92 detects a voice section in the inputted voice. In other words, the voice section detecting unit 92 estimates a background noise level from power information of a voice per certain time period (i.e., per frame), which is called frame power information, and if the frame power is larger than the estimated background noise level and the difference between them is larger than a preset threshold value, determines that this frame is a voice section. Then, after detecting the voice section, if the next voice section is not found even after a predetermined time period T (a speech ending detection time period), the voice section detecting unit 92 determines that an input voice has ended. If the next voice section begins within the time period T, the length of the detected voice section is prolonged. In this manner, the voice section detecting unit 92 determines one voice section.

The signal processing unit 91 receives information in individual voice sections determined by the voice section detecting unit 92 and converts voices corresponding to the individual voice sections into features. The decoder 93 compares an acoustic model (acquired from the acoustic model storing unit 95) obtained by modeling information about which phoneme tends to become what kind of features and the features calculated by the signal processing unit 91, thus calculating a phoneme score for each frame. Furthermore, based on the calculated score, the decoder 93 assumes a word sequence (a sentence) according to a grammar stored in the grammar storing unit 94 and recognition vocabulary information stored in the vocabulary dictionary storing unit 96, thus calculating a score of each word sequence. The decoder 93 sends the obtained word sequence and score to the result output unit 97. When the decoder 93 finishes processing all the features inputted from the signal processing unit 91, it notifies the result output unit 97 that the processing has finished. When being notified by the decoder 93 that the processing has finished, the result output unit 97 outputs the word sequence having the best score calculated in the decoder 93 as a recognition result candidate.

As described above, the conventional voice recognition system can recognize from a user's voice its speech vocabulary sequence.

In many cases, a natural human utterance contains unwanted sounds such as misstatement, hesitation or coughing. In a conversation between humans, it is possible to recognize the self-repair utterance after the misstatement or hesitation accurately or ignore unwanted sounds. Conventionally, in voice recognition systems, there also have been several suggestions for recognizing such a self-repair utterance correctly or ignoring such unwanted sounds.

For example, a voice recognition apparatus has been suggested in which, when conducting a voice recognition per segment, according to the recognition result of preceding segments in a sentence, the handling of the following segment is changed, thereby improving the degree of freedom of a speaker's speech and the voice recognition rate (see JP 7(1995)-230293 A).

SUMMARY OF THE INVENTION

However, the conventional voice recognition apparatus described above has a problem in that it is not until the recognition results of the preceding segments are obtained that the handling of the following segment can be determined.

It is an object of the present invention to provide a voice recognition system and a voice processing system in which only utterance or self-repair utterance that is supposed to be inputted can be inputted and recognized correctly, as in a conversation between humans, before an erroneous recognition occurs in the case where a user makes self-repair utterance immediately after misstatement during an utterance or gives utterance to what is supposed to be inputted after hesitation.

In order to achieve the above-mentioned object, a first voice recognition system according to the present invention includes a signal processing unit for converting inputted speech voice data into a feature, an acoustic model storing unit in which an acoustic model obtained by modeling what kind of feature a voice tends to become is stored in advance, a vocabulary dictionary storing unit in which information of a recognition vocabulary is stored in advance, a voice section detecting unit for detecting voice sections in the speech voice data according to a predetermined voice section criterion, a priority determining unit for selecting a voice section to be given priority from among the voice sections detected by the voice section detecting unit according to a predetermined priority criterion, a decoder for calculating a degree of matching with the recognition vocabulary using the feature of the voice section selected by the priority determining unit and the acoustic model, and a result output unit for outputting a word sequence having the best score in the matching by the decoder as a recognition result. The priority determining unit uses as the predetermined priority criterion at least one selected from the group consisting of (1) a length of the voice section,
(2) a power or an S/N ratio of the voice section, and
(3) a chronological order of the voice section.
(4) Speech speed.

It should be noted that the voice section refers to a section containing successive utterances and may coincide with or differ from a word section.

In the above-described configuration, by using at least one selected from the group consisting of (1) the length of the voice section, (2) the power or the S/N ratio of the voice section and (3) the chronological order of the voice section as the criterion, a voice section that is expected to contain a self-repair utterance can be selected preferentially even if a speech vocabulary sequence of the voice section is not recognized. The "speech vocabulary sequence" in the present invention means the contents of speech. However, the meaning of the vocabulary itself does not have to be recognized. With the above-described configuration, self-repair utterance can be inputted and recognized correctly as in a conversation between humans before an erroneous recognition occurs in the case where a user makes the self-repair utterance immediately after misstatement during an utterance, thus producing an effect of reducing the time required for reinputting a voice (a task achievement time).

In order to achieve the above-mentioned object, a second voice recognition system according to the present invention includes a signal processing unit for converting inputted speech voice data into a feature, an acoustic model storing unit in which an acoustic model obtained by modeling what kind of feature a voice tends to become is stored in advance, a vocabulary dictionary storing unit in which information of a recognition vocabulary is stored in advance, a decoder for calculating a degree of matching with the recognition vocabulary using the feature and the acoustic model, a voice section detecting unit for detecting sections corresponding to a word detected by the decoder to be voice sections, a priority determining unit for selecting a voice section containing a recognition vocabulary to be used preferentially as a recognition result from among the voice sections detected by the voice section detecting unit according to a predetermined priority criterion, and a result output unit for outputting a recognition word sequence having the best score in the matching by the decoder as the recognition result. The priority determining unit uses as the predetermined priority criterion at least one selected from the group consisting of (1) a chronological order with respect to a voice section in which a pre-registered specific vocabulary is detected by the decoder, (2) a chronological order with respect to a voice section in which a pre-registered long vowel is detected by the decoder, and (3) a chronological order with respect to a voice section in which an amount of change in the feature obtained by the signal processing unit continues within a predetermined range.

It should be noted that the specific vocabulary refers to a vocabulary or the like that is assumed to be uttered by a user after a misstatement and before a self-repair utterance, for example. With the above-described configuration, at least one selected from the group consisting of (1) the chronological order with respect to the voice section in which the pre-registered specific vocabulary is detected by the decoder, (2) the chronological order with respect to the voice section in which the pre-registered long vowel is detected by the decoder, and (3) the chronological order with respect to the voice section in which the amount of change in the feature obtained by the signal processing unit continues within the predetermined range is used as the criterion. In the case where the voice section containing the specific vocabulary, the voice section containing the long vowel or the voice section in which the amount of change in the feature continues within the predetermined range has been detected, a self-repaired speech is likely to be contained in a voice section after this voice section, for example. Accordingly, this voice section can be used preferentially as the voice section containing the recognition vocabulary to be used preferentially as the recognition result.

Also, in the second voice recognition system described above, it is preferable that the priority determining unit also uses as the predetermined priority criterion at least one selected from the group consisting of (4) a chronological order with respect to a voice section in which the degree of matching calculated by the decoder is lower than a predetermined threshold value, and (5) the degree of matching calculated by the decoder.

Further, in order to achieve the above-mentioned object, a first voice processing system according to the present invention includes a voice recognition unit for recognizing a speech vocabulary sequence from inputted speech voice data, and a voice input unit for performing an input from a user using a recognition result of the speech voice data generated by the voice recognition unit. The voice recognition unit includes a signal processing unit for converting the speech voice data into a feature, an acoustic model storing unit in which an acoustic model obtained by modeling what kind of feature a voice tends to become is stored in advance, a vocabulary dictionary storing unit in which information of a recognition vocabulary is stored in advance, a voice cut-out unit for detecting speech sections in the speech voice data according to a predetermined speech section criterion, a decoder for matching the feature and the acoustic model and calculating a degree of matching between the result of matching and the recognition vocabulary so as to determine a recognition result candidate based on the calculated degree of matching and generate positional information indicating a position of the recognition result candidate within the speech section, and a result output unit for outputting the recognition result candidate determined by the decoder and the positional information to the voice input unit. The voice input unit includes a specific vocabulary dictionary storing unit in which information of a specific vocabulary is stored in advance, a specific vocabulary determining unit for determining whether or not the recognition result candidate corresponds to the specific vocabulary by referring to the specific vocabulary dictionary storing unit, and a recognition result selecting unit for selecting a recognition result candidate to be adopted as the recognition result based on the positional information using as a criterion a chronological order with respect to the recognition result candidate corresponding to the specific vocabulary.

Moreover, in order to achieve the above-mentioned object, a second voice processing system according to the present invention includes a voice recognition unit for recognizing a speech vocabulary sequence from inputted speech voice data, and a voice input unit for performing an input from a user using a recognition result of the speech voice data generated by the voice recognition unit. The voice recognition unit includes a signal processing unit for converting the speech voice data into a feature, an acoustic model storing unit in which an acoustic model obtained by modeling what kind of feature a voice tends to become is stored in advance, a vocabulary dictionary storing unit in which information of a recognition vocabulary is stored in advance, a voice cut-out unit for detecting speech sections in the speech voice data, a decoder for matching the feature and the acoustic model and calculating a degree of matching between the result of matching and the recognition vocabulary so as to determine a recognition result candidate based on the calculated degree of matching and generate positional information indicating a position of the recognition result candidate within the speech section, and a result output unit for outputting the recognition result candidate determined by the decoder and the positional information to the voice input unit. The voice input unit includes a speech speed calculating unit for calculating a speech speed of the recognition result candidate based on the positional information, and a recognition result selecting unit for selecting a recognition result candidate to be adopted as the recognition result using the speech speed as a criterion.

Further, a first recording medium according to the present invention is a recording medium storing a program allowing a computer to execute a signal processing operation of converting inputted speech voice data into a feature, a voice section detecting operation of detecting voice sections in the speech voice data according to a predetermined voice section criterion, a priority determining operation of selecting a voice section to be given priority from among the voice sections detected in the voice section detecting operation according to a predetermined priority criterion, a matching operation of referring to an acoustic model storing unit in which an acoustic model obtained by modeling what kind of feature a voice tends to become is stored in advance and a vocabulary dictionary storing unit in which information of a recognition vocabulary is stored in advance and using the feature of the voice section selected in the priority determining operation and the acoustic model, thus calculating a degree of matching with the recognition vocabulary, and a result output operation of outputting a word sequence having the best score in the matching operation as a recognition result. In the priority determining operation, the program uses as the predetermined priority criterion at least one selected from the group consisting of (1) a length of the voice section, (2) a power or an S/N ratio of the voice section, and (3) a chronological order of the voice section.

Moreover, a second recording medium according to the present invention is a recording medium storing a program allowing a computer to execute a signal processing operation of converting inputted speech voice data into a feature, a matching operation of referring to an acoustic model storing unit in which an acoustic model obtained by modeling what kind of feature a voice tends to become is stored in advance and a vocabulary dictionary storing unit in which information of a recognition vocabulary is stored in advance and using the feature and the acoustic model, thus calculating a degree of matching with the recognition vocabulary, a voice section detecting operation of detecting voice sections from the speech voice data based on the degree of matching calculated in the matching operation, a priority determining operation of selecting a voice section containing a recognition vocabulary to be used preferentially as a recognition result from among the voice sections detected in the voice section detecting operation according to a predetermined priority criterion, and a result output operation of outputting a word sequence having the best score in the matching operation as the recognition result. In the priority determining operation, at least one selected from the group consisting of (1) a chronological order with respect to a voice section in which a pre-registered specific vocabulary is detected in the matching operation, (2) a chronological order with respect to a voice section in which a pre-registered long vowel is detected in the matching operation, and (3) a chronological order with respect to a voice section in which an amount of change in the feature obtained in the signal processing operation continues within a predetermined range is used as the predetermined priority criterion.

Also, in the second recording medium described above, it is preferable that the priority determining operation also uses as the predetermined priority criterion at least one selected from the group consisting of (4) a chronological order with respect to a voice section in which the degree of matching calculated in the matching operation is lower than a predetermined threshold value, and (5) the degree of matching calculated in the matching operation.

Furthermore, a third recording medium according to the present invention is a recording medium storing a program allowing a computer to realize a function of a voice input unit for performing an input from a user using a recognition result generated by a voice recognition unit for recognizing a speech vocabulary sequence from inputted speech voice data. The voice recognition unit includes a signal processing unit for converting the speech voice data into a feature, an acoustic model storing unit in which an acoustic model obtained by modeling what kind of feature a voice tends to become is stored in advance, a vocabulary dictionary storing unit in which information of a recognition vocabulary is stored in advance, a voice cut-out unit for detecting speech sections in the speech voice data according to a predetermined speech section criterion, a decoder for matching the feature and the acoustic model and calculating a degree of matching between the result of matching and the recognition vocabulary so as to determine a recognition result candidate based on the calculated degree of matching and generate positional information indicating a position of the recognition result candidate within the speech section, and a result output unit for outputting the recognition result candidate determined by the decoder and the positional information as the recognition result. The program allows a computer to execute a specific vocabulary determining operation of determining whether or not the recognition result candidate corresponds to a specific vocabulary by referring to a specific vocabulary dictionary storing unit in which information of the specific vocabulary is stored in advance, and a recognition result selecting operation of selecting a recognition result candidate to be adopted as the recognition result based on the positional information using as a criterion a chronological order with respect to the recognition result candidate corresponding to the specific vocabulary.

Additionally, a fourth recording medium according to the present invention is a recording medium storing a program allowing a computer to realize a function of a voice input unit for performing an input from a user using a recognition result generated by a voice recognition unit for recognizing a speech vocabulary sequence from inputted speech voice data. The voice recognition unit includes a signal processing unit for converting the speech voice data into a feature, an acoustic model storing unit in which an acoustic model obtained by modeling what kind of feature a voice tends to become is stored in advance, a vocabulary dictionary storing unit in which information of a recognition vocabulary is stored in advance, a voice cut-out unit for detecting speech sections in the speech voice data according to a predetermined speech section criterion, a decoder for matching the feature and the acoustic model and calculating a degree of matching between the result of matching and the recognition vocabulary so as to determine a recognition result candidate based on the calculated degree of matching and generate positional information indicating a position of the recognition result candidate within the speech section, and a result output unit for outputting the recognition result candidate determined by the decoder and the positional information as the recognition result. The program allows a computer to execute a speech speed calculating operation of calculating a speech speed of the recognition result candidate based on the positional information, and a recognition result selecting operation of selecting a recognition result candidate to be adopted as the recognition result using the speech speed as a criterion.

In accordance with the present invention, it is possible to provide a voice recognition system and a voice processing system in which self-repair utterance can be inputted and recognized correctly as in a conversation between humans before an erroneous recognition occurs in the case where a user makes self-repair utterance immediately after misstatement during an utterance.

DETAILED DESCRIPTION OF THE INVENTION

Embodiment 1

Figure 1:
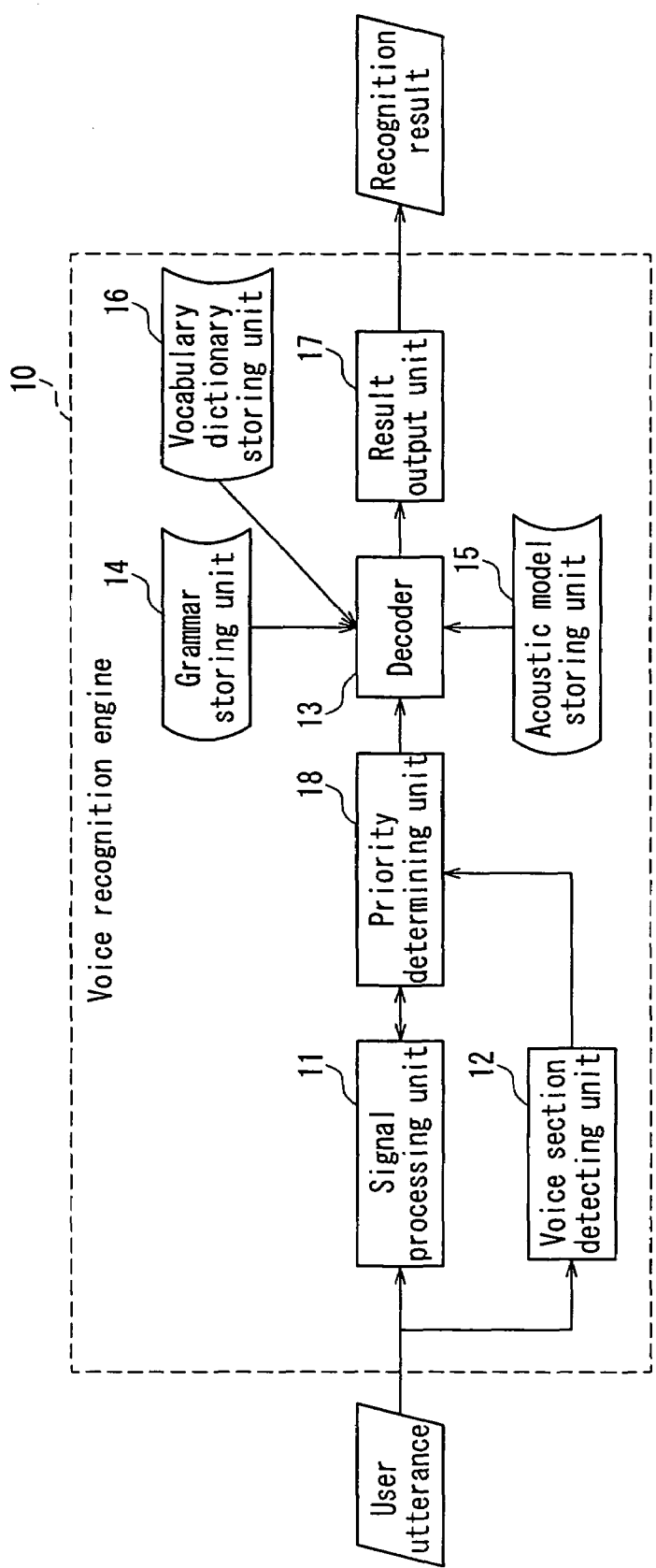
FIG. 1 is a block diagram showing a schematic configuration of a voice recognition engine according to a first embodiment of the present invention.
Figure 2:
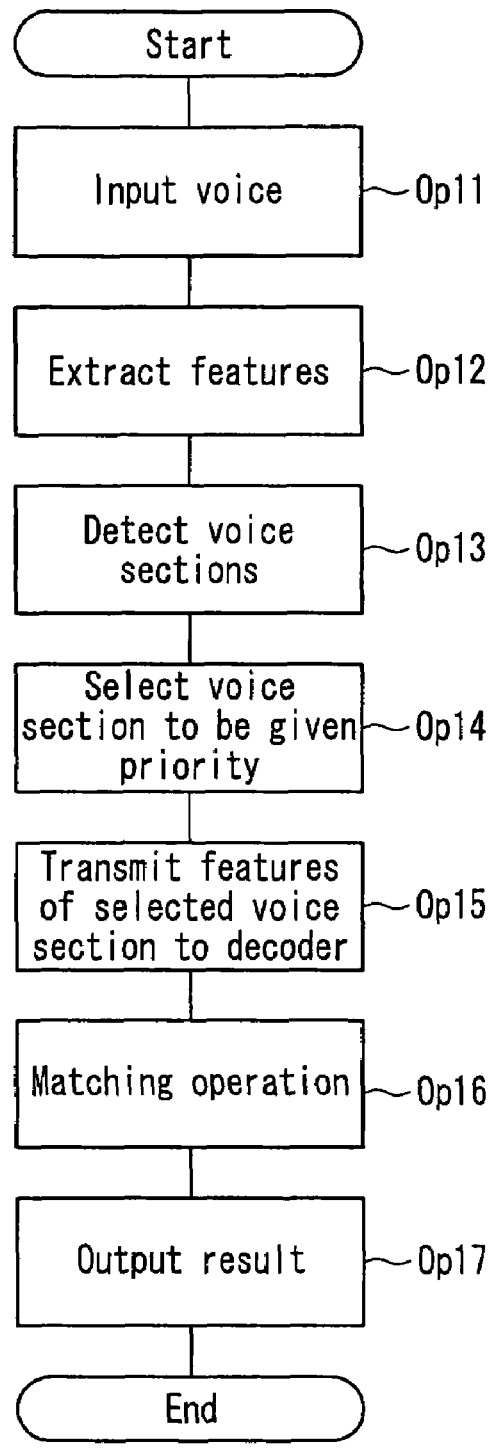
FIG. 2 is a flowchart schematically showing an operation procedure of the voice recognition engine according to the first embodiment.

The following is a description of an embodiment of the present invention, with reference to the accompanying drawings. FIG. 1 is a block diagram showing a schematic configuration of a voice recognition engine according to an embodiment of the present invention. FIG. 2 is a flowchart schematically showing an operation procedure of the voice recognition engine according to the present embodiment.

In other words, the present embodiment is directed to a voice recognition engine that carries out a voice recognition processing for recognizing a speech vocabulary sequence from a user's input voice exclusively and has a function of receiving a user's voice from an upper program such as a voice interactive application and returning a recognition result to the upper program. Accordingly, as shown in FIG. 1, a voice recognition engine 10 in the present embodiment includes a signal processing unit 11, a voice section detecting unit 12, a decoder 13, a grammar storing unit 14, an acoustic model storing unit 15, a vocabulary dictionary storing unit 16 and a result output unit 17.

The voice recognition engine 10 is realized by installing a program in an arbitrary computer such as a personal computer. In other words, the signal processing unit 11, the voice section detecting unit 12, the decoder 13 and the result output unit 17 are embodied by an operation of a CPU of a computer according to a program realizing the functions of these units. Thus, a program for realizing the functions of the signal processing unit 11, the voice section detecting unit 12, the decoder 13 and the result output unit 17 in a computer or a recording medium recording this program is also an embodiment of the present invention. Further, the grammar storing unit 14, the acoustic model storing unit 15 and the vocabulary dictionary storing unit 16 are embodied by a built-in storage device in a computer or a storage device accessible from this computer.

When a voice of a user is inputted, the voice section detecting unit 12 detects voice sections in the inputted voice according to a predetermined voice section criterion. In this example, the voice section detecting unit 12 estimates a background noise level from power information of a voice per certain time period in the inputted voice (i.e., per frame), which is called frame power information, and, if the difference between the estimated background noise level and the frame power is larger than a preset threshold value, determines that this frame is a frame containing a voice (hereinafter, referred to as a voice frame). On the other hand, if the difference between the estimated background noise level and the frame power is smaller than a preset threshold value, the voice section detecting unit 12 determines that this frame is a silent frame.

When the voice section detecting unit 12 finds a first voice frame in the voice inputted from the user, it determines that a voice section has begun. Then, the voice section detecting unit 12 sets a time at which it finds the next silent frame as an ending time candidate of the voice section. If the next voice frame begins within a predetermined time period $T_1$ (a pause detection time period) from the ending time candidate, the voice section detecting unit 12 determines that the voice section continues and clears the ending time candidate that has been found and prolongs the length of the detected voice section. On the other hand, if the predetermined time period $T_1$ has passed since the ending time candidate, the ending of the voice section is defined. In the case where the next voice frame (a beginning time of the next voice section) is not found even after a predetermined time period $T_2$ (a speech ending detection time period; $T_2 > T_1$) since the ending time of the preceding voice frame, the voice section detecting unit 12 determines that the input voice has ended. On the other hand, in the case where the next voice frame is found within the predetermined time period $T_2$, the voice section detecting unit 12 determines that a new voice section that follows has begun.

In this manner, the voice section detecting unit 12 detects a series of voice frames or a set of a plurality of continuous voice frames containing a silent frame shorter than the predetermined time period $T_2$ to be a voice section. Thus, the length of a voice section is a variable length. The range containing all of the voice sections is detected as a speech section of a user.

Further, since the voice section detecting unit 12 determines a voice section according to the presence or absence of a pause (a non-utterance section) regardless of a speech vocabulary sequence, the voice section may coincide with or may differ from a word section, namely, a section consisting solely of a single word. In the case where a user makes a self-repair utterance, for example, says "Osaka, well, I mean Shin-Osaka", unless a sufficiently long pause (equal to or longer than $T_1$) is present between "Osaka" and "well, I mean", the voice section detecting unit 12 detects two voice sections, i.e., "Osaka, well, I mean" and "Shin-Osaka", which differ from the word sections.

As described above, the voice section detecting unit 12 determines one voice section or a plurality of voice sections from a voice inputted from a user. The voice section detecting unit 12 outputs voice section information regarding each voice section to a priority determining unit 18. The voice section information contains information such as a beginning time of a voice section, the length of a voice section and a power or an S/N ratio of each frame, for example. It is noted that the beginning time of a voice section and the length of a voice section are used as voice section identifying information for identifying each voice section individually in the voice recognition engine 10.

The signal processing unit 11 calculates features of individual frames from the inputted voice. As the features, MFCCC, LPC cepstrum, a power, a primary or secondary regression coefficient thereof as well as multidimensional vectors such as results of dimensional compression of these values by a principal component analysis and a discriminant analysis are used in many cases, though there is no particular limitation. The calculated features are stored in an internal memory (not shown) together with information intrinsic to each frame (frame intrinsic information). It should be noted that the frame intrinsic information is data representing, for example, a frame number indicating how manieth frame from the top each frame is, a beginning time and an ending time of each frame and a power.

In the case where the inputted voice contains a plurality of voice sections, the priority determining unit 18 selects one voice section or a plurality of voice sections to be used for matching in the decoder 13 based on the voice section information obtained from the voice section detecting unit 12. Then, the priority determining unit 18 acquires features of only frames belonging to the voice section(s) selected to be used for matching in the decoder 13 from the signal processing unit 11 and sends them to the decoder 13. In this way, the decoder 13 carries out a matching operation, which will be described below, based on only a voice in the voice section(s) selected by the priority determining unit 18.

It is noted that the priority determining unit 18 uses at least one of (1) the length of a voice section,
(2) the power or S/N ratio of a voice section, and
(3) the chronological order of a voice section as a criterion, in order to select a voice section containing a self-repaired word preferentially at the time of selecting a voice section.

In the case of using (1) above as the criterion, the voice section information sent from the voice section detecting unit 12 to the priority determining unit 18 has to contain the length of each voice section, the beginning time and ending time for allowing the length of the voice section to be calculated, the number of frames (the length of frames) indicating how many frames the voice section consists of, or a beginning frame number and an ending frame number. For converting the unit of the number of frames into the unit of time, only a frame shift and the time period of a frame width, which are usually preset fixed values, are necessary. In the present embodiment, the beginning time, the ending time of the voice section and the length of the voice section are contained as the voice section identifying information.

In the case of using (2) above as the criterion, the voice section information has to contain information regarding the power or S/N ratio of each voice section. As the power of each voice section, it may be possible to use a maximum value or a mean value of a power of each frame included in each voice section. Also, as the S/N ratio of each voice section, it may be possible to use a maximum value or a mean value of an S/N ratio of each voice section. Since the S/N ratio is a ratio between a power of a voice section and a power of a noise section, it is appropriate that a mean power of frames other than the voice section be set as an estimated noise level and then the ratio between the estimated noise level and the power of each voice section serve as the S/N ratio.

In the case of using (3) above as the criterion, the voice section information has to contain information representing the order of each voice section on the time series. The order of each voice section on the time series can be determined from serial-numbered voice section identifying information, for example.

In the case of using the length of the voice section in (1) above as the criterion, in order to select a voice section containing a self-repaired word preferentially, it is preferable that the priority determining unit 18 selects N (N is a predetermined natural number) voice sections in decreasing order of their length from among a plurality of voice sections contained in the inputted voice as the voice sections to be used for matching, for example. This is because the voice section containing a self-repaired word is generally longer than the voice section containing a word of hesitation or misstatement. Also, compared with the voice section containing coughing or an unwanted sound such as "Eh" or "Uh", the voice section of a recognition vocabulary is expected to be longer because it consists of a plurality of syllables. Therefore, by selecting long voice sections preferentially, an effect of removing an unwanted sound can be expected.

Alternatively, it is also preferable that the priority determining unit 18 selects voice sections in decreasing order of their length's proximity to a designated utterance length. In other words, the voice section whose length is closest to the designated utterance length is selected first, and then the one whose length is second closest thereto is selected. In this way, a predetermined number of the voice sections are selected. For example, in the case where the contents to be voice-inputted are address whose grammar is of three-level hierarchical structure (for example, three levels of a prefecture name, a city name and a town name), the time period of a single utterance free from misstatement or hesitation is empirically within 3 seconds. Such an upper limit $T_3$ of a maximum time period in the case of a correct utterance for a task (an acceptable sentence) can be obtained from many evaluation data. It is also effective that the priority determining unit 18 utilizes this upper limit and selects a plurality of voice sections in decreasing order of their length under the condition that the sum of the lengths of voice sections does not exceed the preset time period $T_3$, for selecting a voice section containing a self-repaired word preferentially. Conversely, in the case of a task without a short utterance, namely, a vocabulary having a small number of syllables, it is also possible to restrict the voice section in terms of the shortest time period.

Further, in the case of using the power or S/N ratio of the voice section in (2) above as the criterion, in order to select a voice section containing a self-repaired word preferentially, it is preferable that the priority determining unit 18 selects N voice sections in decreasing order of their power or S/N ratio from among a plurality of voice sections contained in the inputted voice as the voice sections to be used for matching. This is because, since a human consciously tries to make an utterance correctly when restating, he/she often makes an utterance more loudly than in the case of hesitation and misstatement.

Also, in the case of using the chronological order of the voice section in (3) above as the criterion, in order to select a voice section containing a self-repaired word preferentially, it is preferable that the priority determining unit 18 selects voice sections located later on the time series (most preferably, the last voice section in the case of an isolated word recognition) from among a plurality of voice sections contained in the inputted voice. This is because, since the self-repair utterance cannot precede misstatement or hesitation, the voice sections located later on the time series are more likely to contain a word uttered correctly. Also, in the case where the grammar is of M-level hierarchical structure (M is a natural number), it is preferable to select M voice sections from the last on the time series from among the plurality of voice sections contained in the inputted voice.

Furthermore, in the case of using (1) and (3) above in combination as the criterion, in order to select a voice section containing a self-repaired word preferentially, it is preferable that the priority determining unit 18 selects a plurality of voice sections that are continuous on the time series in reverse chronological order from the last voice section from among a plurality of the voice sections contained in the inputted voice so that a sum SUM of the lengths of voice sections meets a preset condition (for example, $t_{lower} \leq SUM \leq t_{upper}$; $t_{lower}$ and $t_{upper}$ are preset values that are task dependent and obtained experimentally).

As described above, the voice sections to be used for matching in the decoder 13 are selected by the priority determining unit 18 using the criteria (1) to (3) above, thereby increasing the probability of matching with only voice sections containing words to be recognized (a correctly-uttered word) without self-repair utterance or misstatement.

Incidentally, since all the voice sections could be selected, a usual utterance without misstatement or hesitation is also recognizable as in the conventional case. For this purpose, it is preferable that the selection criteria such as the threshold of the S/N ratio are determined experimentally so as not to exclude correct utterances.

As mentioned earlier, the priority determining unit 18 acquires the features of one voice section or a plurality of voice sections selected to be used for matching in the decoder 13 from the signal processing unit 11 and sends it to the decoder 13.

When the decoder 13 receives the features of the voice section from the priority determining unit 18, it performs the following matching operation based on these features. First, the decoder 13 compares the features of individual voice sections and an acoustic model, thereby calculating a phoneme score for each frame contained in the voice section. Incidentally, the acoustic model is obtained by modeling information about which phoneme tends to become what kind of features, and the mainstream thereof is now a phoneme HMM (Hidden Markov Model). The acoustic model is stored in the acoustic model storing unit 15 in advance.

Furthermore, based on the calculated phoneme score, the decoder 13 assumes a word sequence, i.e., a sentence, according to a grammar stored in the grammar storing unit 14 and recognition vocabulary information stored in the vocabulary dictionary storing unit 16, thus calculating a score that indicates a likelihood of each word sequence. The information about recognition vocabulary contains, for example, an ID for identifying a word and a reading (how the word is uttered) or a phoneme sequence equivalent to a reading and also can contain any other information. The decoder 13 sends the obtained word sequence and the score to the result output unit 17. The grammar to be used in the present invention may be CFG (Context Free Grammar), FSG (Finite State Grammar) or the like and is not particularly limited. However, in the following example, FSG will be used.

Further, when the decoder 13 finishes processing all of the features sent from the priority determining unit 18, it notifies the result output unit 17 that the processing has finished. When being notified by the decoder 13 that the processing has finished, the result output unit 17 outputs the word sequence having the best score calculated in the decoder 13 as a recognition result.

Here, a schematic operation of the voice recognition engine 10 will be described with reference to FIG. 2. When a user starts inputting a voice (Op 11), the inputted voice is sent to the signal processing unit 11 and the voice section detecting unit 12. The signal processing unit 11 extracts features from individual frames of the inputted voice and stores the extracted features in its internal memory (not shown) (Op 12). The voice section detecting unit 12 determines voice sections in the inputted voice according to a predetermined voice section criterion and outputs the resultant voice section information to the priority determining unit 18 (Op 13). It should be noted that, although FIG. 2 is directed to a mode in which the operations Op 12 and Op 13 are executed in series, they may be executed in parallel.

Then, when the voice input is finished, the priority determining unit 18 selects voice sections to be used for a matching operation by the decoder 13 based on the voice section information provided from the voice section detecting unit 12 and any of the above-mentioned priority criteria (Op 14). The priority determining unit 18 transmits voice section identifying information of the selected voice sections (for example, data representing a starting time of each voice section and a section length) to the signal processing unit 11. Based on the voice section identifying information, the signal processing unit 11 extracts the features of only the flame corresponding to these voice sections from the internal memory and returns them to the priority determining unit 18. The priority determining unit 18 transmits these features to the decoder 13 (Op 15). The decoder 13 carries out the above-mentioned matching operation based on these features (Op 16). The result of the matching operation is sent from the decoder 13 to the result output unit 17, and the result output unit 17 outputs the recognition result (Op 17).

As described above, in accordance with the present embodiment, in the case where a voice containing self-repair utterance after hesitation or misstatement is inputted, it is possible to select voice sections that are likely to contain the self-repair utterance preferentially and output the recognition result using the features of these voice sections.

In a voice speech, the power tends to become smaller at the beginning of utterance, the ends of a word and a clause and the like, leading to an error in determining whether or not a frame is a voice frame. Accordingly, the voice section detecting unit 12 sometimes can combine a preset length of guard frames before and after the section detected to be the voice section. In the case where the intervals between voice sections are small, a plurality of voice sections sometimes can be united depending on the length of guard frames. Conversely, since an excessively short voice section is assumed to be a sporadic noise, it is also possible to add an operation of rejecting this voice section.

Also, instead of determining whether or not each voice section should be used for matching in the decoder 13, the priority determining unit 18 may calculate the priority of each voice section as a priority score based on the criteria (1) to (3)

above. In this case, it is appropriate that the decoder 13 add or sum up the priority score of the voice section containing each word to the score of the word sequence serving as the recognition result candidate and, based on the result, determine the recognition result. As an example of the priority score, an S/N ratio can simply serve as a priority in the case of (2) above. Further, it is also possible to provide a configuration in which, when the value of the priority is equal to or smaller than a preset value, it is not sent to the decoder 13.

By using a constraint that each word does not straddle a plurality of voice sections (no pause is present in a word) in the decoder 13, the priority score of the voice section at which the word is located can be determined uniquely. In the case of carrying out the matching without using this constraint, it is also possible to provide a configuration in which the priority score is recalculated in the priority determining unit 18 from an average of a plurality of voice sections, a ratio between word sections in the voice section, etc.

Also, in the present embodiment, using the criteria (1) to (3) above, the priority determining unit 18 determines the voice section to be selected preferentially from among a plurality of voice sections contained in the inputted voice. However, conversely, pursuant to the criteria (1) to (3) above, it also may be possible to determine a voice section to be removed from the voice sections contained in the inputted voice, namely, a voice section that should not be used for matching in the decoder 13.

Further, in the present embodiment, the priority determining unit 18 acquires only the features of the selected voice sections from the signal processing unit 11 and sends them to the decoder 13. However, it also may be possible to provide a configuration in which the signal processing unit 11 outputs the features of all the voice frames to the priority determining unit 18 and the priority determining unit 18 selects only the features of the frames belonging to the selected voice sections and outputs them to the decoder 13.

Moreover, in the present embodiment, it is not necessary to wait for all the processings until the speech section is defined. Instead, the signal processing unit 11 can send the features to the decoder sequentially in the order in which the voice sections are defined in the voice section detecting unit, and the decoder can use the features of the frames inputted by then to proceed with the processing sequentially, thereby reducing a response time.

Additionally, although the features of all the input frames are calculated in the present embodiment, it is also possible to provide a configuration in which only the frame defined as the speech section is calculated, thus reducing an amount of processing. In this case, the voice section detection (Op 13) precedes the feature extraction (Op 12) in FIG. 2.

Embodiment 2

Figure 3:
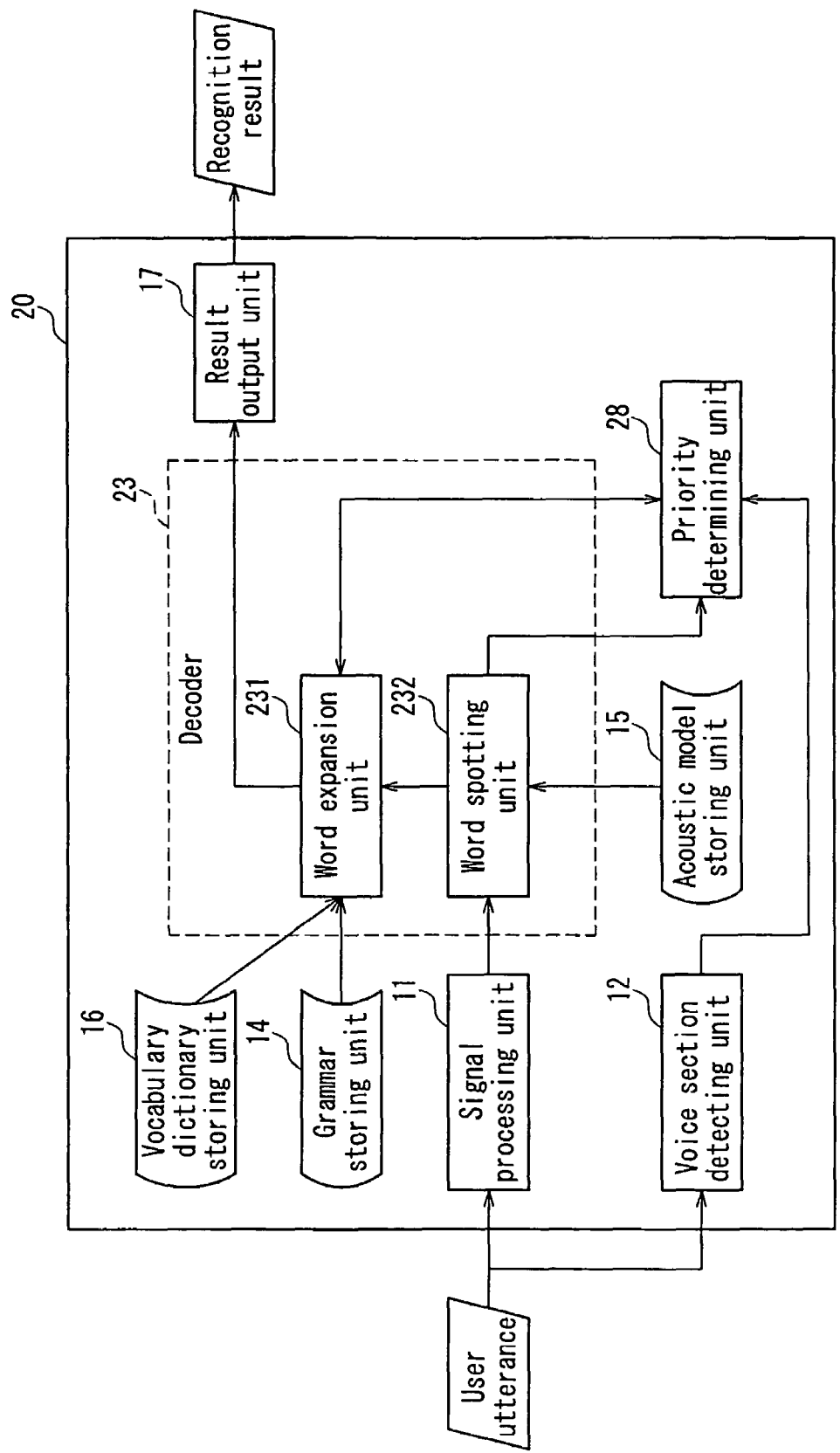
FIG. 3 is a block diagram showing a schematic configuration of a voice recognition engine according to a second embodiment.

The following is a description of another embodiment of the present invention, with reference to the accompanying drawings. FIG. 3 is a block diagram showing a schematic configuration of a voice recognition engine 20 according to the present embodiment. A configuration having a function similar to that in Embodiment 1 will be assigned the same reference numeral as in Embodiment 1, and the detailed description thereof will be omitted here.

As shown in FIG. 3, the voice recognition engine 20 according to the present embodiment includes a signal processing unit 11, a voice section detecting unit 12, a decoder 23, a grammar storing unit 14, an acoustic model storing unit 15, a vocabulary dictionary storing unit 16, a result output unit 17 and a priority determining unit 28.

Unlike the voice recognition engine 10 according to Embodiment 1, in the voice recognition engine 20 of the present embodiment, the voice section detecting unit 12 also notifies the signal processing unit of a speech section (a range including all voice sections). The signal processing unit 11 calculates only the features of individual frames contained in the notified speech section and provides them to the decoder 23.

As shown in FIG. 3, the decoder 23 includes a word expansion unit 231 and a word spotting unit 232. The word expansion unit 231 first refers to the vocabulary dictionary storing unit 16 and presents a word candidate list according to each hierarchy of the grammar to the word spotting unit 232.

The word spotting unit 232 acquires from the acoustic model storing unit 15 a model of each phoneme corresponding to a phoneme string constituting each word contained in the word candidate list presented by the word expansion unit 231 and uses the acquired phoneme model and the features provided from the signal processing unit 11 to see whether each word appears in the inputted voice by a word spotting technique and, if it does, calculate its position and score. An ID of the word whose score is equal to or larger than a predetermined threshold value $S_W$, information specifying an associated word section (hereinafter, referred to as word section information) and its score are sent to the priority determining unit 28 and the word expansion unit 231. The word section information can be, for example, data of a beginning time of that word section and the length of the section or a beginning time and an ending time of the word section.

The above-noted word ID is for identifying a word and may be a numerical value or a notation intrinsic to each word. In the following, for the sake of simplicity, the word ID is not specifically referred to in some cases. For example, a word sequence is actually a word ID sequence.

The priority determining unit 28 matches voice section information sent from the voice section detecting unit 12 and the word section information sent from the word spotting unit 232, determines which voice section contains the word in question and associates this voice section with the word score. If this voice section is already associated with any word score, the better score is adopted. By repeating this, a maximum score among the word scores associated with respective voice sections is stored. Then, the priority determining unit 28 determines to adopt only the voice sections whose associated score is equal to or larger than a predetermined threshold value $S_H$ ($S_H > S_W$). The condition $S_H > S_W$ is for obtaining an effect greater than a performance of rejecting out-of-grammar utterances by word spotting.

Considering the case in which a plurality of words are contained in a single voice section, the priority determining unit 28 also can carry out the following processing. Words that are associated with each voice section are combined insofar as the word sections do not overlap, and the sum of the word scores of this combination is used as the score of this combination. A combination whose score is the best among all the combinations is selected. The voice section is divided by that word border, and then a score of each voice section is calculated. When the score is equal to or larger than the predetermined threshold value, the corresponding voice section is determined to be adopted.

There are various word spotting techniques (algorithms) that can be used by the word spotting unit 232 (for example, see Kenji Aoyama, "Word Spotting Voice Recognition," Journal of Japan Society for Fuzzy Theory and Systems VOL. 11, No. 3, p.p. 403-407, 1999), though the present invention is not particularly limited to any technique. Depending on the algorithm used by the word spotting unit 232, when the signal processing unit 11 outputs features per frame, the word spotting unit 232 can proceed with a processing in synchronization therewith. Although the score of the voice section for determining the priority is defined later than the output of the feature frame, the priority determining unit 28 and the word expansion unit 231 can start processing before the word spotting unit 232 finishes processing for all the voice sections if the start of the processing is delayed by the time period corresponding to the definition delay.

While developing grammar information, the word expansion unit 231 selects a word sequence that is acceptable in the grammar, in which the word sections of respective words in the sequence do not overlap on a time axis, in which an appearing order of respective words in the sequence in the grammar and a positional relationship thereof on the time axis are the same, in which the word sections of respective words in the word sequence are associated with all of the voice sections adopted by the priority determining unit 28, and in which the sum of word scores are the best, from among word sequences obtained by combining the words in the result outputted from the word spotting unit 232, and outputs it to the result output unit 17 as a recognition result. The following is a specific description of its operation.

The word expansion unit 231 refers to grammar information stored in the grammar storing unit 14 and a vocabulary dictionary stored in the vocabulary dictionary storing unit 16, sequentially develops word sequences according to a constraint of word order by the grammar, and inputs each word sequence into a buffer (FIFO) $B_A$. Next, the word expansion unit 231 sequentially takes out the word sequences in the buffer $B_A$, checks if the last word is present in such a manner as not to overlap its preceding word in the result outputted from the word spotting unit 232, and if it is, inputs it into a buffer $B_B$ as a recognition result candidate.

Here, for example, grammar information that an address is to be voice-inputted, a word to be inputted first (the first hierarchy) is a prefecture name, and a word to be inputted next (the second hierarchy) is a word representing a city name, a town name or a village name in each prefecture is assumed to be pre-registered in the grammar storing unit 14. In this case, the word expansion unit 231 first processes the hierarchy of the prefecture name and inputs "Okinawa-prefecture" to "Hokkaido" sequentially into the buffer $B_A$ as a word sequence consisting of one word.

Next, a word sequence consisting solely of "Okinawa-prefecture" located first in the buffer $B_A$ is extracted, and an attention is paid to the word "Okinawa-prefecture" present at the end of the sequence. Since no word is present before "Okinawa-prefecture", whether or not this word is present in the detection result of the word spotting unit 232 is checked regardless of the position. If "Okinawa-prefecture" is detected, its word ID, word section information and score are stored in association with the word sequence consisting solely of "Okinawa-prefecture" and inputted into a buffer $B_B$. Here, in the case where a plurality of "Okinawa-prefecture" are present in the detection result of the word spotting unit 232, all of them are inputted into the buffer $B_B$ as separate word sequences. Further, regardless of whether "Okinawa-prefecture" is present in the detection result, the already-processed word sequence consisting solely of "Okinawa-prefecture" is abandoned. This is repeated until the buffer $B_A$ becomes empty.

When the buffer $B_A$ becomes empty, the first word sequence in the buffer $B_B$ is extracted. In the case where the extracted sequence is "Okinawa-prefecture", the word in the second hierarchy following this "Okinawa-prefecture" is developed and registered in the buffer $B_A$. In this way, a two-word sequence consisting of "Okinawa-prefecture" and one word representing a city name, a town name or a village name following "Okinawa-prefecture" is obtained.

Since the buffer $B_A$ is not empty, the processing of the buffer $B_A$ is performed. When a word sequence "Okinawa-prefecture, Naha-city" is located first in the buffer $B_A$, whether or not "Naha-city" is present after the voice section "Okinawa-prefecture" without an overlap of their voice sections in the detection result of the word spotting unit 232 is checked. If it is, its word ID, word section information and score are stored, and the scores of "Okinawa-prefecture" and "Naha-city" are added together so as to be the score of "Okinawa-prefecture, Naha-city" and stored in association with this word sequence. Then, a word following "Naha-city" is developed according to the grammar and registered in the buffer $B_B$. Thereafter, regardless of whether "Naha-city" is present after the voice section of "Okinawa-prefecture", the already-processed word sequence "Okinawa-prefecture, Naha-city" is abandoned.

In this manner, words are sequentially developed and processed according the grammar. In the case where the word sequence located first in the buffer $B_B$ reaches a terminal state of the grammar and cannot be developed any more, this word sequence is registered in a recognition result candidate list as a recognition result candidate word sequence. When the buffers $B_A$ and $B_B$ both become empty, the developing processing ends.

In the above description, the technique of developing (searching for) a word sequence that is acceptable in the grammar is not particularly limited and can be other searches such as a breadth-first search, a depth-first search or a best-first based on a score.

Further, the grammar that can be used in the present invention is not limited to a tree structure. There is a restriction in a searching technique resulting from the grammar structure; for example, in a grammar having a loop, a depth-first search may fall into an infinite loop. However, since there is a restriction in terms of a word section when checking if the word is present in the detection result of the word spotting unit 232, even a depth-first search does not fall into the infinite loop.

Moreover, it is also possible to provide a configuration in which, instead of using a grammar (automation information) as a language model, a probability model of N sets of words (N-gram) is utilized, so that the sum of an occurrence probability of a word sequence and a word score serves as a score of the word sequence.

In general, one word that reads the same but is located at different positions in the grammar could be uttered plural times during a single input. Also, even if the word spotting technique is used for detecting each word, it is still difficult to detect the border between words, so that a higher recognition probability for a sentence can be achieved when several frames of detection sections are allowed. Accordingly, the word spotting unit may output the result such that one word is detected plural times even if the sections overlap.

Also, when the word expansion unit 231 finds a plurality of the words that are given attention to and have different voice sections and probably different scores after the word section of the preceding word in the output result of the word spotting unit 232, it divides the word sequence into plural parts so as to correspond to the respective word sections.

Incidentally, since the score of a word sequence tends to be dependent on the time period of utterance, it is also preferable to add a normalized processing such as dividing by the sum of time periods of words in the word sequence.

After finishing the developing processing, the word expansion unit 231 selects recognition result candidates whose words in the sequence are all associated with the voice section adopted by the priority determining unit 28 from the recognition result candidate list and outputs the one having the best score among them to the result output unit 17 as the recognition result. The above-mentioned score is the total of the word scores contained in the recognition result candidate sequence. At this time, it is also possible to send the score as well.

With the configuration described above, according to the voice recognition engine 20, it is possible to obtain the recognition result using only the voice section containing the word whose word score is equal to or larger than the threshold value $S_H$ in the priority determining unit 28. For example, when there is a misstatement, the misstated word is unlikely to be contained in the word candidate list of the grammar (in other words, an utterance out of the recognition vocabulary), so that the score of this word is smaller than the threshold value. Thus, there is a great possibility that the voice section containing this word is correctly rejected by the priority determining unit 28. On the other hand, since a self-repaired word is likely to be contained in the word candidate list in the grammar hierarchy, the word score is equal to or larger than the threshold value. Thus, there is a great possibility that the voice section containing this word is adopted by the priority determining unit 28. Consequently, it becomes possible to remove the voice section containing an unexpected word such as misstatement or hesitation and correctly select the voice section in which the recognition vocabulary is assumed to be uttered.

Figure 4:
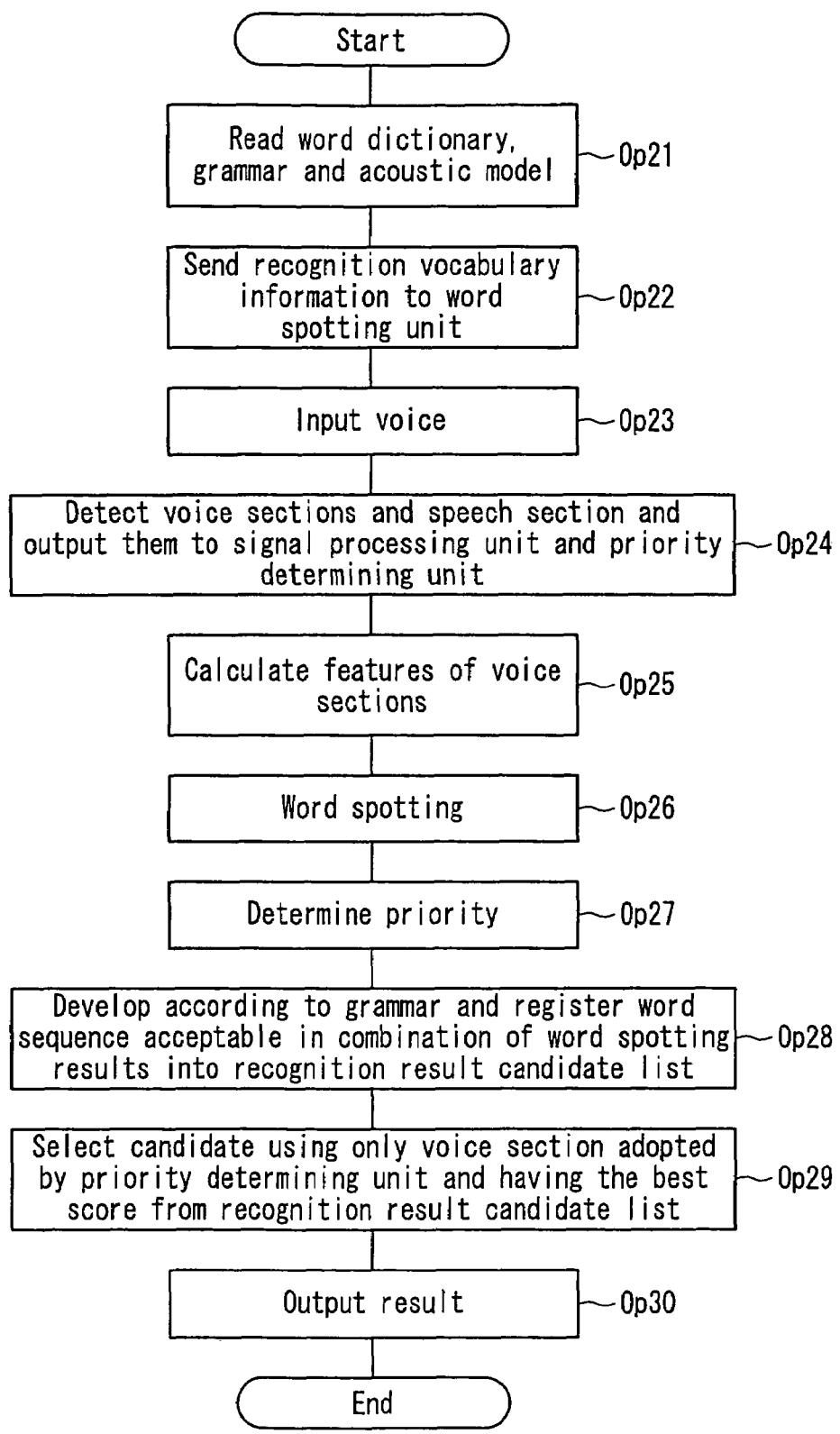
FIG. 4 is a flowchart schematically showing an operation procedure of the voice recognition engine according to the second embodiment.

Here, referring to FIG. 4, a schematic operation procedure of the voice recognition engine 20 of the present embodiment will be described. First, the word expansion unit 231 in the decoder 23 acquires grammar information from the grammar storing unit 14 and recognition vocabulary information from the vocabulary dictionary storing unit 16, respectively, and the word spotting unit 232 acquires acoustic model information from the acoustic model storing unit 15 (Op 21). The word expansion unit 231 sends the acquired recognition vocabulary information to the word spotting unit 232 (Op 22). Then, when a user starts inputting a voice (Op 23), the voice section detecting unit 12 determines the voice sections in the inputted voice and outputs voice section information as the determination result to the signal processing unit 11 and the priority determining unit 28 (Op 24). The signal processing unit 11 calculates features of the inputted voice sections and outputs them to the word spotting unit 232 (Op 25). The word spotting unit 232 sequentially receives the features that the signal processing unit 11 extracts from the inputted voice, detects a word in the vocabulary dictionary by a spotting processing and sends word section information and a word score of the detected word to the priority determining unit 28 and the word expansion unit 231 (Op 26).

The priority determining unit 28 matches the voice section information sent from the voice section detecting unit 12 and the word section information sent from the word spotting unit 232 and, if the best word score among the words contained in each voice section exceeds a preset threshold, determines to adopt this voice section (Op 27).

Here, the word expansion unit 231 develops the word sequence that is acceptable according to the grammar information and registers a word sequence that is acceptable in the grammar, in which the word sections of respective words in the sequence do not overlap on a time axis, and in which an appearing order of respective words in the sequence in the grammar and a positional relationship thereof on the time axis are the same, from word sequences obtained by combining the words in the result outputted from the word spotting unit 232 into the recognition result candidate list (Op 28). Subsequently, the word expansion unit 231 selects a word sequence in which the word sections of respective words in the sequence are associated with all of the voice sections adopted by the priority determining unit 28, and in which the sum of word scores is the best, from among the word sequences in the recognition result candidate list (Op 29) and outputs it to the result output unit 17 as a recognition result (Op 30).

As described above, based on the word score at the time of detecting each word in the vocabulary dictionary by word spotting, the voice recognition engine according to the present embodiment determines the score of each voice section and adopts only the voice sections whose score is equal to or larger than a predetermined threshold value. In this manner, it is possible to remove the voice section containing misstatement or the like as the voice section of an out-of-vocabulary speech effectively. Furthermore, an utterance without any self-repair utterance achieves a good score because the recognition vocabulary is spotted in each voice section, so that all of the voice sections remain without being rejected and can be recognized correctly as in a conventional case.

Embodiment 3

Figure 5:
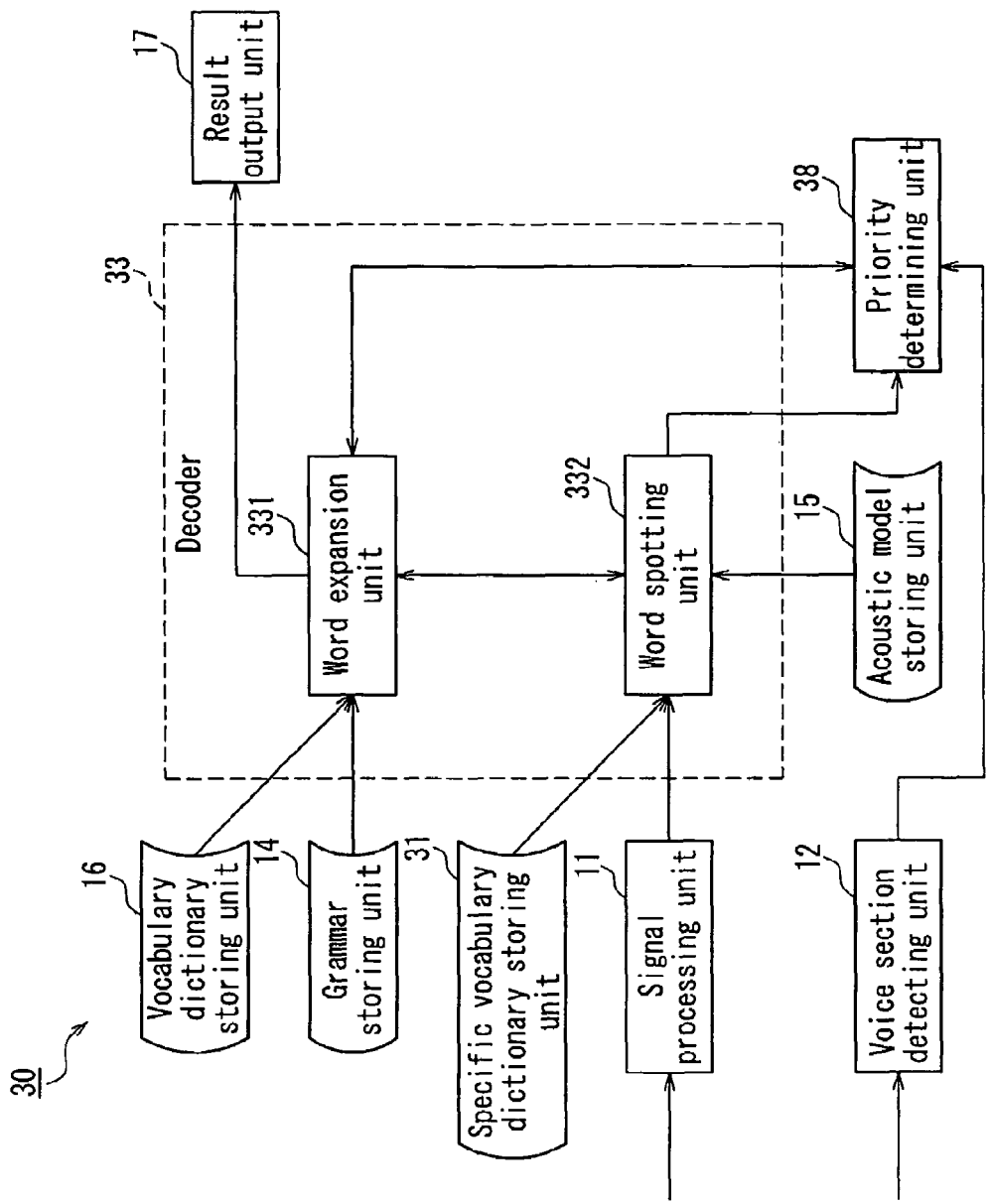
FIG. 5 is a block diagram showing a schematic configuration of a voice recognition engine according to a third embodiment.

The following is a description of yet another embodiment of the present invention, with reference to the accompanying drawings. FIG. 5 is a block diagram showing a schematic configuration of a voice processing system (a voice recognition engine 30) according to the present embodiment. A configuration having a function similar to that in the above-described embodiments will be assigned the same reference numeral as in those embodiments, and the detailed description thereof will be omitted here.

As shown in FIG. 5, the voice recognition engine 30 further includes a specific vocabulary dictionary storing unit 31 in which a specific vocabulary dictionary is stored in advance. The specific vocabulary refers to words that a speaker who has noticed his/her misstatement is likely to utter consciously or almost unconsciously immediately before a self-repair utterance. In the specific vocabulary dictionary, a predetermined specific vocabulary may be stored at the time of manufacturing, or the registration contents may be added, deleted or changed by a user as necessary. Examples of the specific vocabulary include "restatement", "no", "I made a mistake", "well, I mean", etc, though there is no limitation to them.

Also, the voice recognition engine 30 includes a decoder 33 including a word expansion unit 331 and a word spotting unit 332. Unlike Embodiment 2, the word spotting unit 332 detects whether or not each word in the specific vocabulary in the specific vocabulary dictionary storing unit 31 in addition to the words in the vocabulary dictionary appears in the inputted voice from the features provided from the signal processing unit 11 and the information of an acoustic model and, if it does, calculates its position and score. Then, in the case where there is a word in the specific vocabulary whose score is equal to or larger than a predetermined threshold value, the word spotting unit 332 notifies a priority determining unit 38 that the specific vocabulary has been detected from the inputted voice and of information specifying a voice section containing that specific vocabulary (hereinafter, referred to as specific vocabulary section information). The specific vocabulary section information can be, for example, data of a beginning time of the voice section containing this specific vocabulary and the length of this section or data of a beginning time and an ending time of the voice section. When detecting a usual word in the vocabulary dictionary other than those in the specific vocabulary, its word ID, information for specifying an associated word section (word section information) and score are sent to the priority determining unit 38 and the word expansion unit 331 similarly to Embodiment 2.

When the priority determining unit 38 receives the above-noted notification from the word spotting unit 332, it adopts only a voice section after the voice section in which the specific vocabulary has been detected among the voice sections contained in the inputted voice. Accordingly, the priority determining unit 38 rejects all of the voice sections located before the voice section in which the specific vocabulary has been detected on a time axis (cancels the voice sections that have been determined to be adopted).

For example, even if a user utters "from Osaka, no, from Shin-Osaka to Tokyo" when he/she is supposed to say "from Shin-Osaka to Tokyo", as long as the word "no" is registered as the specific vocabulary, the voice section corresponding to "from Osaka, no," is rejected and only the voice section corresponding to the self-repair utterance "from Shin-Osaka to Tokyo" becomes a subject of recognition, so that the recognition is carried out correctly. In a conventional example, when a user misstates "from Osaka", he/she stops the speech at this moment, waits until a misrecognition result is returned and then makes a self-repair utterance "from Shin-Osaka to Tokyo" as a reinput. Therefore, in accordance with the present embodiment, it becomes possible to input a voice very efficiently compared with this conventional example.

In the example described above, when a user makes a misstatement, all of the voice sections preceding the voice section in which the specific vocabulary is detected are canceled. Therefore, the user has to make a self-repair utterance from the beginning of the sentence even if the sentence to be inputted (a word sequence) is long. However, there is no limitation to this example, and it is also possible to consider a configuration in which a self-repair utterance of one word can be inputted and recognized. In this case, it is appropriate that the priority determining unit 38 cancel the voice section in which the specific vocabulary has been detected and the voice section immediately before that voice section. In this way, even if a user utters "one adult, no, two adults from Tokyo to Kobe" when he/she is supposed to say "two adults from Tokyo to Kobe", as long as the word "no" is registered as the specific vocabulary, the voice sections corresponding to "one adult, no," are rejected and only the voice section corresponding to "two adults from Tokyo to Kobe" containing the self-repair utterance becomes a subject of recognition, so that the recognition is carried out correctly.

As described above, in accordance with the voice recognition engine 30 of the present embodiment, when the specific vocabulary that a user utters immediately after misstatement is recognized, a recognition processing is resumed after at least one voice section preceding this specific vocabulary is abandoned, so that the voice section containing the misstatement can be rejected correctly and the self-repaired voice section can be inputted and recognized correctly. Further, since the voice section of an utterance containing no specific vocabulary, which is free from self-repair utterance, is not rejected, such an utterance can be recognized correctly as in the conventional example.

Figure 6:
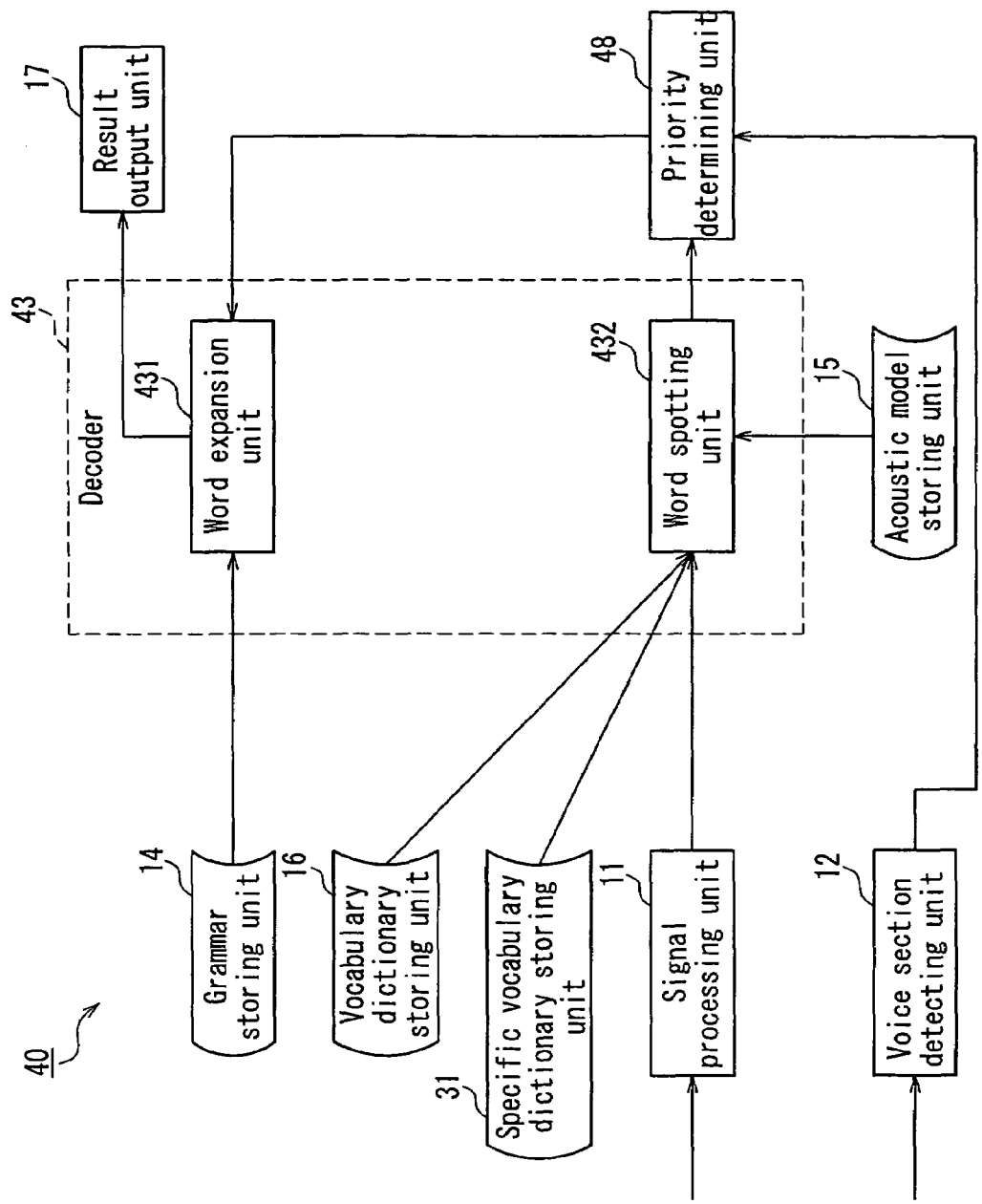
FIG. 6 is a block diagram showing a schematic configuration of a voice recognition engine according to the third embodiment.

Moreover, by changing the configuration of FIG. 5 slightly, it is also possible to provide a configuration as shown in FIG. 6. In FIG. 6, a word spotting unit 432 reads the vocabulary dictionaries from the vocabulary dictionary storing unit 16 and the specific vocabulary dictionary storing unit 31 by itself and outputs word detection results only to a priority determining unit 48. The priority determining unit 48 outputs only a result associated with the voice section that is determined to be adopted from among the inputted word detection results to a word expansion unit 431. With this configuration, the voice section containing the misstatement can be rejected correctly and the self-repaired voice section can be inputted and recognized correctly, similarly to that of FIG. 5.

Embodiment 4

Figure 7:
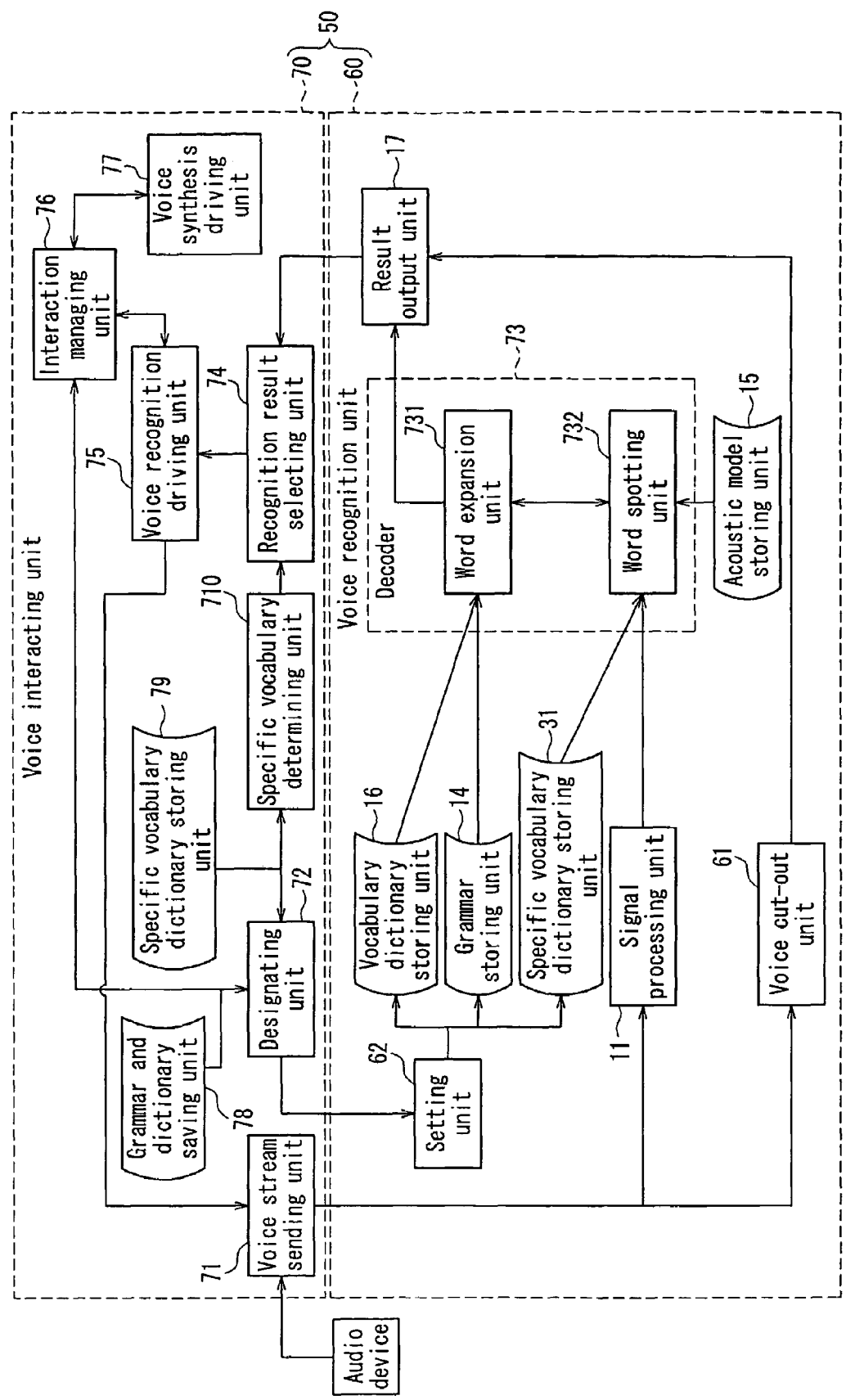
FIG. 7 is a block diagram showing a schematic configuration of a voice processing system according to a fourth embodiment.

The following is a description of yet another embodiment of the present invention, with reference to the accompanying drawings. FIG. 7 is a block diagram showing a schematic configuration of a voice processing system 50 according to the present embodiment. A configuration having a function similar to that in the above-described embodiments will be assigned the same reference numeral as in those embodiments, and the detailed description thereof will be omitted here.

The embodiments described above have the configuration in which the voice recognition engine itself determines which voice section should be given priority. In contrast, the voice processing system 50 according to the present embodiment has a configuration in which a voice recognition unit (a voice recognition engine) and a voice interacting unit serving as its upper application share an operation of determining the priority of each voice section. Accordingly, as shown in FIG. 7, the voice processing system 50 includes a voice recognition unit 60 and a voice interacting unit 70 serving as its upper application. The voice interacting unit 70 manages the state of voice interaction and carries out voice synthesis utilizing the voice recognition result from the voice recognition unit 60, thereby interacting with a user. Incidentally, although the present embodiment illustrates the voice interacting unit as the upper application, the function of the upper application is not limited to the voice interaction. Any application using a voice recognition for input from a user can serve as the upper application.

The voice recognition unit 60 and the voice interacting unit 70 are realized respectively by installing a program in an arbitrary computer such as a personal computer. It is noted that a program for realizing the respective functions of the voice recognition unit 60 and the voice interacting unit 70 in a computer or a recording medium recording this program is also an embodiment of the present invention.

The voice recognition unit 60 includes a signal processing unit 11, a grammar storing unit 14, a vocabulary dictionary storing unit 16, an acoustic model storing unit 15, a result output unit 17, a specific vocabulary dictionary storing unit 31 and a decoder 73 that are similar to those in the voice recognition engine 30 in Embodiment 3. In addition to the above, the voice recognition unit 60 includes a voice cut-out unit 61 and a setting unit 62.

The voice interacting unit 70 includes a voice stream sending unit 71, a designating unit 72, a specific vocabulary determining unit 710, a recognition result selecting unit 74, a voice recognition driving unit 75, an interaction managing unit 76, a voice synthesis driving unit 77, a grammar and dictionary saving unit 78 and a specific vocabulary dictionary storing unit 79.

The interaction managing unit 76 reads out a vocabulary dictionary, a grammar and a specific vocabulary that are to be used by the voice recognition unit 60 from the grammar and dictionary saving unit 78 and the specific vocabulary dictionary storing unit 79 according to a preset interaction scenario and sends them to the voice recognition unit 60 via the designating unit 72. Then, the interaction managing unit 76 instructs the voice recognition driving unit 75 to send out voice data inputted from an audio device from the voice stream sending unit 71 to the voice recognition unit 60.

In the voice recognition unit 60, the setting unit 62 stores the information sent from the designating unit 72 in the voice interacting unit 70, namely, the vocabulary dictionary, the grammar and the specific vocabulary that are to be used in an interaction phase at this time into the vocabulary dictionary storing unit 16, the grammar storing unit 14 and the specific vocabulary dictionary storing unit 31, respectively. In this way, a word expansion unit 731 and a word spotting unit 732 carry out a matching operation by referring to the vocabulary dictionary, the grammar and the specific vocabulary dictionary that are designated here.

The voice cut-out unit 61 detects a section in which a sentence to be recognized is present (a speech section). In other words, "the voice section detecting unit" used in the above-described embodiments detects a pause in an utterance so as to detect a plurality of voice sections separated by the pause, whereas the voice cut-out unit 61 does not detect voice sections. Therefore, the voice cut-out unit 61 senses the beginning of an utterance (the beginning of a speech section) based on a power variation of an inputted voice stream and, if no utterance is present for a certain time period after sensing the utterance, determines that an input utterance has ended (the-end of the speech section). Then, the voice cut-out unit 61 outputs information representing the beginning time and ending time of the speech section (speech section information) to the signal processing unit 11.

It should be noted that the voice data sent out from the voice stream sending unit 71 are also provided to the signal processing unit 11. Based on the speech section information inputted from the voice cut-out unit, the signal processing unit 11 extracts features only from the voice data in the voice section and transmits them to the decoder 73.

In the decoder 73, the word expansion unit 731 sets recognition vocabulary information to the word spotting unit 732 similarly to Embodiment 3. The word spotting unit 732 performs a spotting processing of each word in the vocabulary dictionary and the specific vocabulary dictionary and outputs the results to the word expansion unit 731, similarly to the description of Embodiment 3 except that it does not output the results to the priority determining unit. The word expansion unit 731 sets the recognition vocabulary information to the word spotting unit 732 and, upon receipt of the results from the word spotting unit 732, selects while developing the grammar information a word sequence that is acceptable in the grammar, in which the word sections of respective words in the sequence do not overlap on a time axis, and in which an appearing order in the grammar and a positional relationship on the time axis are the same, from among word sequences obtained by combining the words in the results outputted from the word spotting unit, thus outputting it to the result output unit 17. There is a possibility that these word sequences may contain the specific vocabulary.

Incidentally, the grammar has to be a grammar that takes account of the possibility that the specific vocabulary is uttered at the time of self-repair utterance. For example, by adding a transition of returning to an immediately preceding word from each state of a grammar that takes no account of self-repair utterance via the specific vocabulary, it becomes possible to respond to the self-repair utterance of one word. Similarly, by adding a transition of returning to a beginning state via the specific vocabulary, it becomes possible to respond to the self-repair utterance from the beginning of the speech.

Based on the speech section information sent from the voice cut-out unit 61 and a result of matching by the decoder 73, the result output unit 17 generates information indicating where the word contained in each word sequence in the recognition result is located on a time axis (word section information). Furthermore, the result output unit 17 calculates the total of word scores of each of a plurality of the word sequences received from the decoder 73 (the scores of the word sequences). Then, the result output unit 17 returns N word sequences in decreasing order of their score from among the plurality of word sequences to the voice interacting unit 70 as recognition result candidates (N-Best processing). It should be noted that N may be constant or dynamically changeable by the interaction managing unit 76 according to the state of interaction. The information of the recognition result candidates returned from the result output unit 17 to the voice interacting unit 70 also contains word section information of the words contained in each word sequence.

The recognition result selecting unit 74 sends each word sequence returned from the voice recognition unit 60 as the recognition result candidate to the specific vocabulary determining unit 710. The specific vocabulary determining unit 710 refers to the specific vocabulary dictionary storing unit 79 and checks whether or not the specific vocabulary is contained in each word sequence as the recognition result candidate and, if it is, which word section contains the specific vocabulary. In the case of receiving a reply that the specific vocabulary is contained from the specific vocabulary determining unit 710, the recognition result selecting unit 74 adds a predetermined point to the score of the word contained in the word section immediately after the word section containing the specific vocabulary, thereby rescoring all of the above-noted N word sequences. This is because a self-repaired vocabulary is likely to be contained in the word section immediately after the specific vocabulary. At the same time, the specific vocabulary itself and the section to be self-repaired are deleted from the word sequence because they are not needed. Here, in the case of deleting all of the words before the specific vocabulary as the section to be self-repaired, a user has to make a self-repair utterance from the beginning of the sentence. In the case of deleting only the word immediately before the specific vocabulary, a user can correct the misstatement of one word.

The recognition result selecting unit 74 returns the word sequence found to have the best score when rescoring N word sequences to the voice recognition driving unit 75 as a final recognition result. Upon receipt of the recognition result, the voice recognition driving unit 75 both instructs the voice stream sending unit 71 to stop sending out the voice data to the voice recognition unit 60 and returns the final recognition result to the interaction managing unit 76. The interaction managing unit 76 makes the voice synthesis driving unit 77 synthesize an appropriate response voice according to the final recognition result.

With the configuration described above, in the case where the specific vocabulary considered to be located immediately before the self-repair utterance such as "restatement", "I made a mistake" or "well, I mean" is uttered, it is possible to reject this vocabulary and the voice section or word immediately before the vocabulary and allow the voice interacting unit 70 to give priority to the word section immediately after the vocabulary. Accordingly, an increase in the probability of accepting a self-repair utterance is expected.

It is also preferable that the voice interacting unit 70 can adjust how many points are added in order to give priority to the word immediately after the self-repair utterance according to the state of interaction (for example, a complexity of information to be voice-inputted, etc.).

Embodiment 5

Figure 8:
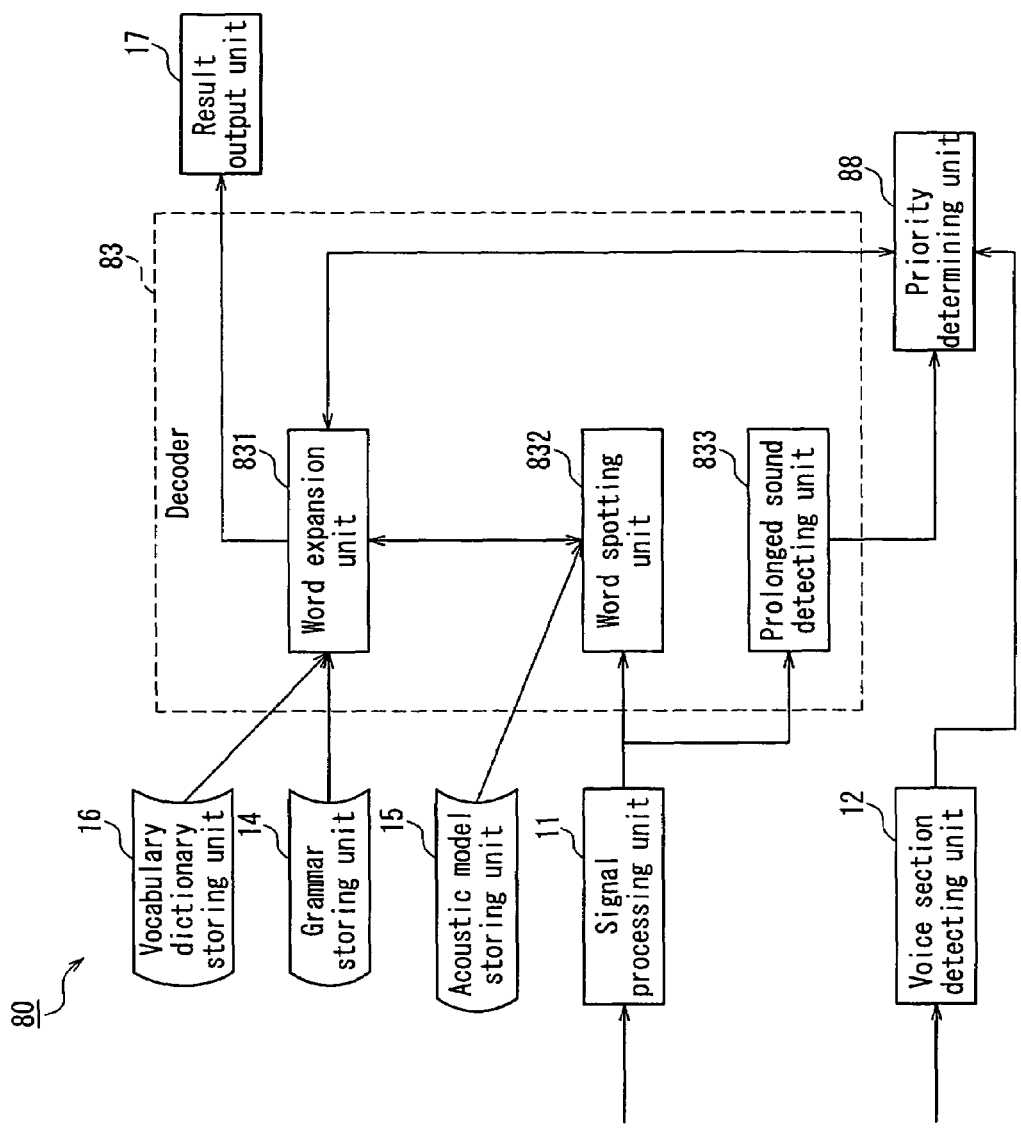
FIG. 8 is a block diagram showing a schematic configuration of a voice recognition engine according to a fifth embodiment.

The following is a description of yet another embodiment of the present invention, with reference to the accompanying drawings. FIG. 8 is a block diagram showing a schematic configuration of a voice recognition engine 80 according to the present embodiment. A configuration having a function similar to that in the above-described embodiments will be assigned the same reference numeral as in those embodiments, and the detailed description thereof will be omitted here.

As shown in FIG. 8, the voice recognition engine 80 of the present embodiment includes a signal processing unit 11, a voice section detecting unit 12, a decoder 83, a grammar storing unit 14, an acoustic model storing unit 15, a vocabulary dictionary storing unit 16, a result output unit 17 and a priority determining unit 88. The decoder 83 includes a word expansion unit 831, a word spotting unit 832 and a prolonged sound detecting unit 833.

The prolonged sound detecting unit 833 compares input features sent from the signal processing unit 11 and an acoustic model obtained from the acoustic model storing unit 15 and, when detecting a voice section containing successive prolonged sounds, notifies the priority determining unit 88 of information specifying this voice section. The priority determining unit 88 adopts a voice section immediately after the voice section in which the last prolonged sound has been detected. Alternatively, the priority determining unit 88 also may add a priority point to the word score of the voice section immediately after the voice section in which the last prolonged sound has been detected so as to give priority to this voice section.

The voice section containing successive prolonged sounds is likely to contain an utterance of hesitation such as "Eh" or "Uh". Thus, with the configuration described above, it is expected that the probability of accepting an utterance will increase significantly by adopting or giving priority to the voice section immediately after the voice section in which the last prolonged sound has been detected.

The above description has illustrated the configuration of providing the prolonged sound detecting unit 833 for detecting a voice section containing successive prolonged sounds. However, there is no limitation to the above, and a similar effect can be obtained with the configuration in which a functional block for detecting a voice section with a small variation in the features of the inputted voice is provided instead of the prolonged sound detecting unit 833.

Furthermore, it is preferable that the priority determining unit considers only a prolonged sound lasting at least for a preset time period as a hesitation so as not to respond to a prolonged sound in the recognition vocabulary. Alternatively, it is also preferable that a time period for successive prolonged sounds detected by the prolonged sound detecting unit is set to be at least a preset time period. Incidentally, it is preferable that an optimal value for the preset time period is calculated experimentally.

Embodiment 6

Figure 9:
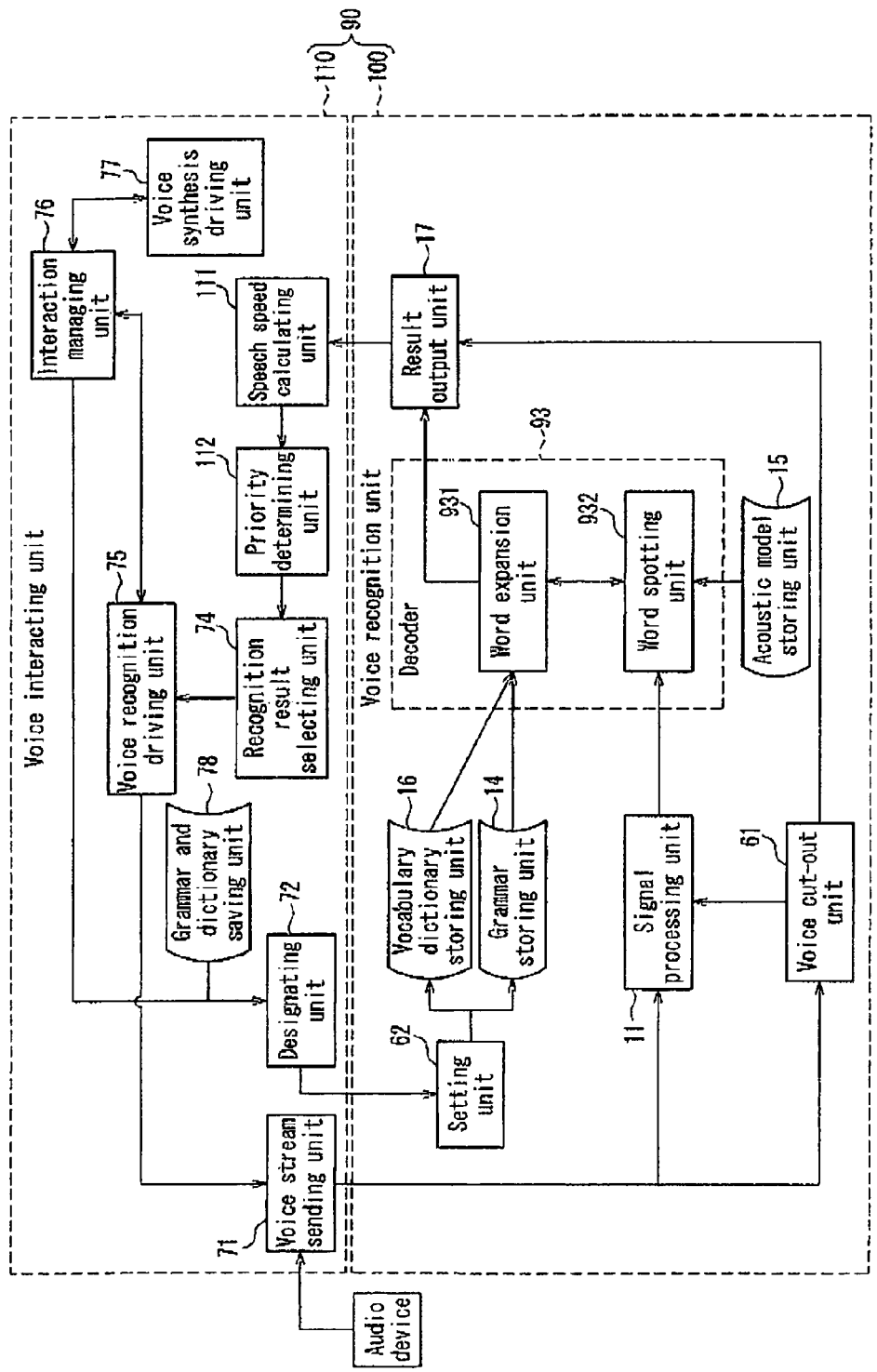
FIG. 9 is a block diagram showing a schematic configuration of a voice processing system according to a sixth embodiment.
Figure 10:
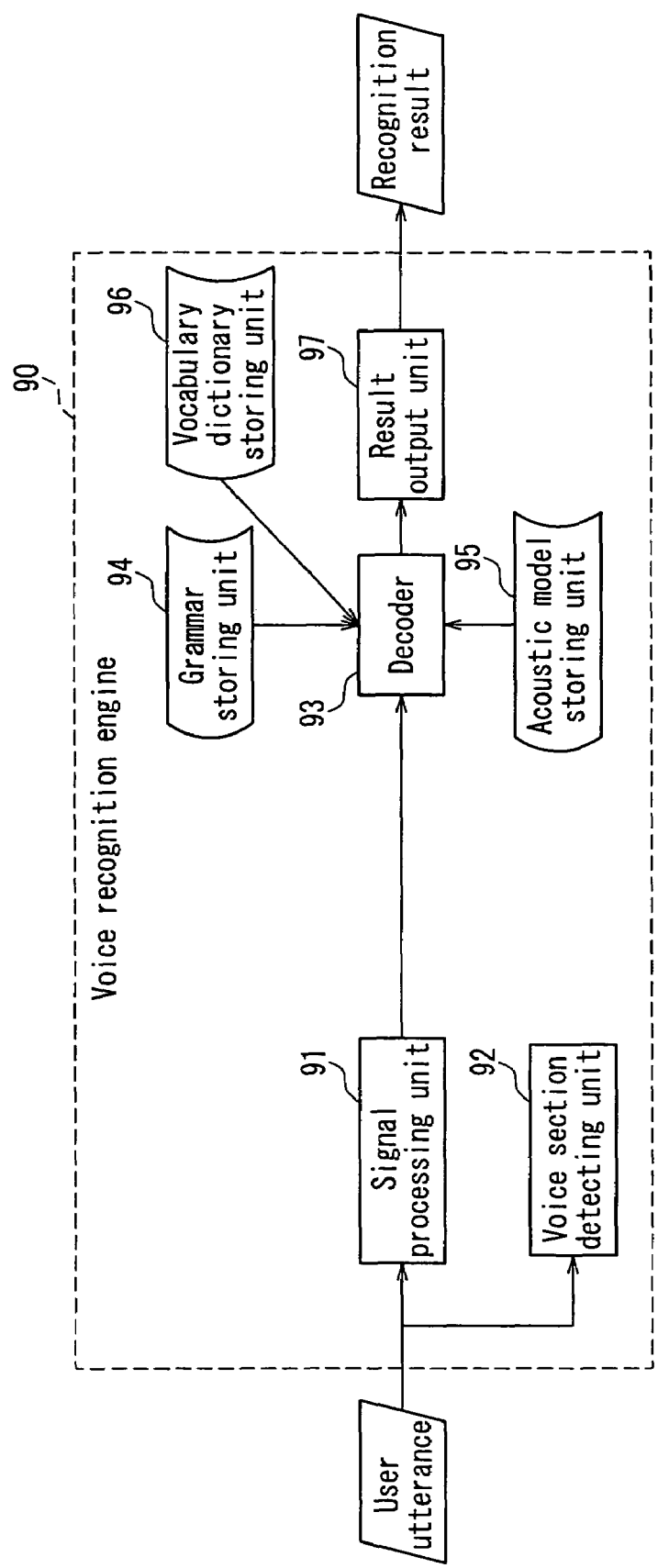
FIG. 10 is a block diagram showing a schematic configuration of a conventional voice processing system.

The following is a description of yet another embodiment of the present invention, with reference to the accompanying drawings. FIG. 9 is a block diagram showing a schematic configuration of a voice processing system 90 according to the present embodiment. A configuration having a function similar to that in the above-described embodiments will be assigned the same reference numeral as in those embodiments, and the detailed description thereof will be omitted here.

As shown in FIG. 9, the voice processing system 90 according to the present embodiment includes a voice recognition unit 100 and a voice interacting unit 110 serving as its upper application. The voice interacting unit 110 manages the state of voice interaction and carries out voice synthesis utilizing the voice recognition result from the voice recognition unit 100, thereby interacting with a user.

The voice recognition unit 100 and the voice interacting unit 110 are realized respectively by installing a program in an arbitrary computer such as a personal computer. It is noted that a program for realizing the respective functions of the voice recognition unit 100 and the voice interacting unit 110 in a computer or a recording medium recording this program is also an embodiment of the present invention.

In the voice processing system 90, the voice interacting unit 110 calculates a speech speed in each voice section (word section) by using a recognition result (a word sequence and a reading thereof, and the position of words on a time axis (a speech time period)) returned from the voice recognition unit 100, estimates a voice section that is uttered slowly for self-repair utterance and gives priority to this section.

Thus, the voice processing system 90 has the following configuration. The voice recognition unit 100 includes a signal processing unit 11, a grammar storing unit 14, a vocabulary dictionary storing unit 16, an acoustic model storing unit 15, a result output unit 17 and a decoder 93 that are similar to those in the voice recognition engine 30 in Embodiment 3. In addition to the above, the voice recognition unit 100 includes a voice cut-out unit 61 and a setting unit 62. The voice interacting unit 110 includes a voice stream sending unit 71, a designating unit 72, a recognition result selecting unit 74, a voice recognition driving unit 75, an interaction managing unit 76, a voice synthesis driving unit 77 and a grammar and dictionary saving unit 78. Incidentally, a configuration having a function similar to that in Embodiment 4 will be assigned the same reference numeral, and the detailed description thereof will be omitted here.

The interaction managing unit 76 in the voice interacting unit 110 reads out a vocabulary dictionary and a grammar that are to be used by the voice recognition unit 100 from the grammar and dictionary saving unit 78 according to a preset interaction scenario and sends them to the voice recognition unit 100 via the designating unit 72. Then, the interaction managing unit 76 instructs the voice recognition driving unit 75 to send out voice data inputted from an audio device from the voice stream sending unit 71 to the voice recognition unit 100.

In the voice recognition unit 100, the setting unit 62 stores the information sent from the designating unit 72 in the voice interacting unit 110, namely, the vocabulary dictionary and the grammar that are to be used in an interaction phase at this time into the vocabulary dictionary storing unit 16 and the grammar storing unit 14, respectively. In this way, a word expansion unit 931 and a word spotting unit 932 carry out a matching operation by referring to the vocabulary dictionary and the grammar that are designated here.

The voice cut-out unit 61 senses the beginning of an utterance based on a power variation of an inputted voice stream. In the case where no utterance is present for a certain time period after sensing the utterance, the voice cut-out unit 61 determines that an input utterance has ended and notifies the result output unit 17 of it.

The word expansion unit 931 sends out word sequences as recognition candidates to the result output unit 17 and, at this time, adds a reading of each word and voice section information. At the point in time when the result output unit 17 receives the notification that the utterance has ended from the voice cut-out unit 61, it transmits N word sequences in decreasing order of their score from among the word sequences received as recognition results from the decoder 93 to the voice interacting unit 110 together with the reading of each word and the voice section information.

A speech speed calculating unit 111 calculates from the reading and the voice section length, the speech speed (for example, the number of syllables/msec) of each word in all the word sequences received from the result output unit 17 and transmits it to a priority determining unit 112 in combination with the corresponding word.

The priority determining unit 112 overwrites (rescores) the score of words in the received word sequence so as to give priority to the score of the voice section with a slow speech speed. This is because a speaker often speaks slowly and carefully not to make a misstatement again when making a self-repair utterance. In other words, this is because the voice section with a slow speech speed is likely to contain a self-repaired significant word. The rescoring is not particularly limited but can be, for example, a processing of dividing a word score by a ratio with respect to a preset standard speech speed so as to decrease the score for a word with a fast speech speed and increase the score for a word with a slow speech speed.

The recognition result selecting unit 74 sums up the word scores that have been subjected to the rescoring by the priority determining unit 112 for each word sequence and recalculates the score of the word sequence. Then, the recognition result selecting unit 74 notifies the voice recognition driving unit 75 of the word sequence having the best score as a final recognition result.

With the configuration described above, it is expected that a slow self-repair utterance part will be inputted and recognized more easily.

Incidentally, it is also preferable that the priority determining unit 112 not only gives priority to the score of the voice section with a slow speech speed but also determines a voice section (a word) immediately before the voice section with a slow speech speed to be a misstatement and cancels it. Furthermore, in the case where the decoder 93 has a function of ignoring an out-of-grammar speech (word), it is also preferable that the recognition result selecting unit 74 selects a recognition candidate in which a voice section immediately before the voice section with a slow speech speed is ignored.

The above description has been directed to several embodiments of the present invention. However, the present invention is not limited only to these embodiments but can be modified in various ways within the scope of the invention.

For example, the unit of matching in the decoder in each embodiment is not limited to phonemes but may be syllables, mora, demisyllables or words. Moreover, the matching may be performed per set of K phonemes, syllables, mora, demisyllables or words (K is a natural number), for example, triphone in units of three phonemes.

Further, various algorithms have been suggested conventionally as a technique of calculating a score of a word or a score of a word sequence from a score (a likelihood) of each frame in a phoneme. In the present invention, any algorithms may be used when calculating the score of a word or that of a word sequence.

Moreover, Embodiments 1 to 4 also can be combined with the voice cut-out unit included in Embodiment 5 or 6. Additionally, it is also possible to provide a configuration of detecting a voice section from internal information of the voice cut-out unit.

The present invention can be utilized as a voice recognition engine or a voice processing system for recognizing a speech vocabulary sequence from a user's voice and accepting it as an input to the system.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A voice recognition system comprising:
 a signal processing unit for converting inputted speech voice data into a feature;
 an acoustic model storing unit in which an acoustic model obtained by modeling what kind of feature a voice tends to have is stored in advance;
 a vocabulary dictionary storing unit in which information of a recognition vocabulary is stored in advance;
 a voice section detecting unit for detecting voice sections in the speech voice data according to a predetermined voice section criterion;
 a priority determining unit for selecting a voice section that includes a self-repair utterance from among the detected voice sections detected by the voice section detecting unit according to a predetermined priority criterion, without using any result of recognizing a speech vocabulary sequence;
 a decoder for calculating a matching score with the recognition vocabulary using the feature of the voice section selected by the priority determining unit and the acoustic model; and
 a result output unit for outputting a word sequence having the best score in the matching by the decoder as a recognized result.

2. The voice recognition system according to claim 1, wherein the priority determining unit uses as the predetermined priority criterion at least one selected from
 (1) a length of the detected voice section,
 (2) a power or an S/N ratio of the detected voice section, and
 (3) a chronological order of the detected voice section.

3. The voice recognition system according to claim 2, wherein (1) the length of the detected voice section is used as the predetermined priority criterion, and the priority determining unit selects a predetermined number of detected voice sections in decreasing order of their length.

4. The voice recognition system according to claim 2, wherein (1) the length of the detected voice section is used as the predetermined priority criterion, and the priority determining unit selects a predetermined number of detected voice sections in decreasing order of their length's proximity to a predetermined utterance length.

5. The voice recognition system according to claim 2, wherein (1) the length of the detected voice section is used as the predetermined priority criterion, and the priority determining unit selects a predetermined number of detected voice sections in decreasing order of their length under a condition that a sum of the lengths of the voice sections does not exceed a predetermined time period.

6. The voice recognition system according to claim 2, wherein (2) the power or the S/N ratio of the detected voice section is used as the predetermined priority criterion, and the priority determining unit selects a predetermined number of detected voice sections in decreasing order of their power or S/N ratio.

7. The voice recognition system according to claim 2, wherein (3) the chronological order of the detected voice section is used as the predetermined priority criterion, and the priority determining unit selects a predetermined number of detected voice sections from a last voice section on the time series from among a plurality of the detected voice sections contained in the speech voice data.

8. The voice recognition system according to claim 2, wherein (3) the chronological order of the detected voice section is used as the predetermined priority criterion, and when a grammar used in the decoder is of M-level hierarchical structure (M is a natural number), the priority determining unit selects last M detected voice sections on the time series from among a plurality of detected voice sections contained in an inputted voice.

9. The voice recognition system according to claim 2, wherein (1) the length of the detected voice section and (3) the chronological order of the detected voice section are used in combination as the predetermined priority criterion, and the priority determining unit selects a plurality of detected voice sections that are continuous on the time series in reverse chronological order from a last detected voice section from among a plurality of detected voice sections contained in an inputted voice so that a sum of lengths of the selected detected voice sections falls within a predetermined range.

10. A voice processing system comprising:
a voice recognition unit for recognizing a speech vocabulary sequence from inputted speech voice data;
and a voice input unit for performing an input from a user using a recognition result of the speech voice data generated by the voice recognition unit;
wherein the voice recognition unit comprises
a signal processing unit for converting the speech voice data into a feature,
an acoustic model storing unit in which an acoustic model obtained by
modeling what kind of feature a voice tends to have is stored in advance,
a vocabulary dictionary storing unit in which information of a recognition vocabulary is stored in advance,
a voice cut-out unit for detecting speech sections in the speech voice data,
a decoder for matching the feature and the acoustic model and calculating a matching score between the result of matching and the recognition vocabulary so as to determine a recognized result candidate based on the calculated matching score and generate positional information indicating a position of the recognized result candidate within the speech section, and
a result output unit for outputting the recognized result candidate determined by the decoder and the positional information to the voice input unit, and
the voice input unit comprises
a speech speed calculating unit for calculating a speech speed of the recognized result candidate based on the positional information,
and a recognition result selecting unit for selecting the recognized result candidate that includes a self-repair utterance using the speech speed as a criterion without using any result of recognizing a speech vocabulary sequence.

11. A voice recognition system comprising:
a signal processing unit for converting inputted speech voice data into a feature;
an acoustic model storing unit in which an acoustic model obtained by modeling what kind of feature a voice tends to have is stored in advance;
a vocabulary dictionary storing unit in which information of a recognition vocabulary is stored in advance;
a decoder for calculating a matching score with the recognition vocabulary using the feature and the acoustic model;
a voice section detecting unit for detecting sections corresponding to a word detected by the decoder to be voice sections;
a priority determining unit for selecting a voice section that includes a self-repair utterance from among the detected voice sections detected by the voice section detecting unit according to a predetermined priority criterion, without using any result of recognizing a speech vocabulary sequence; and
a result output unit for outputting a recognized word sequence having the best score in the matching by the decoder as a recognized result.

12. The voice recognition system according to claim 11, wherein the priority determining unit uses as the predetermined priority criterion at least one selected from
(1) a chronological order with respect to a voice section in which a pre-registered long vowel is detected by the decoder, and
(2) a chronological order with respect to a voice section in which an amount of change in the feature obtained by the signal processing unit continues within a predetermined range.

13. The voice recognition system according to claim 12, wherein the priority determining unit also uses as the predetermined priority criterion at least one selected from
(3) a chronological order with respect to a voice section in which the matching score calculated by the decoder is lower than a predetermined threshold value, and
(4) the matching score calculated by the decoder.

14. A recording medium storing a program allowing a computer to execute
a signal processing operation of converting inputted speech voice data into a feature;
a voice section detecting operation of detecting voice sections in the speech voice data according to a predetermined voice section criterion;
a priority determining operation of selecting a voice section that includes a self-repair utterance from among the detected voice sections detected in the voice section detecting operation according to a predetermined priority criterion, without using any result of recognizing a speech vocabulary sequence;
a matching operation of referring to an acoustic model storing unit in which an acoustic model obtained by modeling what kind of feature a voice tends to have is stored in advance and a vocabulary dictionary storing unit in which information of a recognition vocabulary is stored in advance and using the feature of the voice section selected in the priority determining operation and the acoustic model, thus calculating a matching score with the recognition vocabulary; and
a result output operation of outputting a word sequence having the best score in the matching operation as a recognized result.

15. The recording medium according to claim 14, wherein in the priority determining operation, the program uses as the predetermined priority criterion at least one selected from
  (1) a length of the detected voice section,
  (2) a power or an S/N ratio of the detected voice section, and
  (3) a chronological order of the detected voice section.

16. A recording medium storing a program allowing a computer to execute
  a signal processing operation of converting inputted speech voice data into a feature;
  a matching operation of referring to an acoustic model storing unit In which an acoustic model obtained by modeling what kind of feature a voice tends to have is stored in advance and a vocabulary dictionary storing unit in which information of a recognition vocabulary is stored in advance and using the feature and the acoustic model, thus calculating a matching score with the recognition vocabulary;
  a voice section detecting operation of detecting voice sections from the speech voice data based on the matching score calculated in the matching operation;
  a priority determining operation of selecting a voice section that includes a self-repair utterance from among the detected voice sections detected in the voice section detecting operation according to a predetermined priority criterion, without using any result of recognizing a speech vocabulary sequence; and
  a result output operation of outputting a word sequence having the best score in the matching operation as a recognized result.

17. The recording medium according to claim 16, wherein in the priority determining operation, at least one selected from
  (1) a chronological order with respect to a voice section in which a pre-registered long vowel is detected in the matching operation, and
  (2) a chronological order with respect to a voice section in which an amount of change in the feature obtained in the signal processing operation continues within a predetermined range,
is used as the predetermined priority criterion.

18. The recording medium according to claim 17, wherein the priority determining operation also uses as the predetermined priority criterion at least one selected from
  (3) a chronological order with respect to a voice section in which the matching score calculated in the matching operation is lower than a predetermined threshold value, and
  (4) the matching score calculated in the matching operation.

* * * * *